United States Patent
Pierson et al.

(10) Patent No.: US 8,776,225 B2
(45) Date of Patent: Jul. 8, 2014

(54) NETWORK SECURITY AND FRAUD DETECTION SYSTEM AND METHOD

(75) Inventors: Greg Pierson, Gresham, OR (US); Jason DeHaan, Chicago, IL (US)

(73) Assignee: iovation, Inc., Portland, OR (US)

( * ) Notice: Subject to any disclaimer, the term of this patent is extended or adjusted under 35 U.S.C. 154(b) by 1265 days.

(21) Appl. No.: 11/058,846

(22) Filed: Feb. 15, 2005

(65) Prior Publication Data
US 2005/0278542 A1    Dec. 15, 2005

Related U.S. Application Data

(63) Continuation-in-part of application No. 10/867,871, filed on Jun. 14, 2004, now Pat. No. 7,272,728.

(51) Int. Cl.
*G06F 21/00* (2013.01)
*H04L 29/06* (2006.01)

(52) U.S. Cl.
CPC ............ *H04L 63/0876* (2013.01); *H04L 63/08* (2013.01)
USPC .................................. 726/23; 726/25; 726/26

(58) Field of Classification Search
CPC ............................ H04L 63/08; H04L 63/0876
USPC ...................... 726/3, 22, 26, 23; 705/73, 7.29; 709/223, 224; 455/410; 713/182
See application file for complete search history.

(56) References Cited

U.S. PATENT DOCUMENTS

| | | | |
|---|---|---|---|
| 5,337,357 A | 8/1994 | Chou et al. | 380/4 |
| 5,696,824 A | 12/1997 | Walsh | |
| 5,819,226 A | 10/1998 | Gopinathan et al. | |
| 5,838,306 A | 11/1998 | O'Connor et al. | |
| 5,903,478 A | 5/1999 | Fintel et al. | |
| 6,026,166 A | 2/2000 | LeBourgeois | 380/25 |
| 6,108,790 A | 8/2000 | Moriya et al. | 713/202 |
| 6,148,407 A | 11/2000 | Aucsmith | 713/212 |
| 6,222,547 B1 | 4/2001 | Schwuttke et al. | |
| 6,243,468 B1 | 6/2001 | Pearce et al. | |
| 6,263,376 B1 | 7/2001 | Hatch et al. | |
| 6,324,267 B1 | 11/2001 | Hraster et al. | 379/93.02 |
| 6,418,472 B1 | 7/2002 | Mi et al. | |
| 6,425,085 B2 | 7/2002 | Hashikura | 713/202 |
| 6,442,696 B1 | 8/2002 | Wray et al. | 713/201 |
| 6,449,645 B1 | 9/2002 | Nash | 709/224 |

(Continued)

FOREIGN PATENT DOCUMENTS

| | | |
|---|---|---|
| CA | 2667279 | 10/2008 |
| CN | 1353383 | 6/2002 |

(Continued)

OTHER PUBLICATIONS

English Translation, CN1353383, Method and System for transaction of Electronic File, Published Jun. 12, 2002.

(Continued)

*Primary Examiner* — Samson Lemma
(74) *Attorney, Agent, or Firm* — Davis Wright Tremaine LLP; Heather M. Colburn

(57) ABSTRACT

A system and method to detect and prevent fraud in a system is provided. The system may uniquely identify physical devices connecting to a network, register unique devices, track end-user logins, associate end-user accounts with specific devices, and share information with multiple network service providers is described.

39 Claims, 15 Drawing Sheets

(56) References Cited

U.S. PATENT DOCUMENTS

| | | |
|---|---|---|
| 6,460,140 B1 | 10/2002 | Schoch et al. ............... 713/200 |
| 6,569,205 B1 | 5/2003 | Poggi |
| 6,571,339 B1* | 5/2003 | Danneels et al. ............... 726/9 |
| 6,856,963 B1* | 2/2005 | Hurwitz ...................... 705/7.29 |
| 6,868,525 B1 | 3/2005 | Szabo |
| 6,914,968 B1 | 7/2005 | Ryley et al. |
| 6,928,558 B1 | 8/2005 | Allahwerdi et al. |
| 7,024,177 B2 | 4/2006 | Bhasin et al. |
| 7,047,414 B2 | 5/2006 | Wheeler et al. |
| 7,210,169 B2 | 4/2007 | Smith et al. |
| 7,231,657 B2 | 6/2007 | Honarvar et al. |
| 7,263,506 B2 | 8/2007 | Lee et al. |
| 7,272,728 B2 | 9/2007 | Pierson et al. |
| 7,310,780 B2 | 12/2007 | Diering et al. |
| 7,373,515 B2 | 5/2008 | Owen et al. |
| 7,403,922 B1 | 7/2008 | Lewis et al. |
| 7,529,731 B2 | 5/2009 | Bier |
| 7,562,058 B2 | 7/2009 | Pinto et al. |
| 7,610,617 B2 | 10/2009 | Kelly et al. |
| 7,685,206 B1 | 3/2010 | Mathew et al. |
| 7,882,121 B2 | 2/2011 | Bruno |
| 7,908,645 B2 | 3/2011 | Varghese et al. |
| 2001/0044896 A1 | 11/2001 | Schwartz et al. |
| 2002/0035622 A1* | 3/2002 | Barber ......................... 709/220 |
| 2002/0059130 A1 | 5/2002 | Cheng et al. |
| 2002/0073046 A1* | 6/2002 | David ............................ 705/67 |
| 2002/0111996 A1 | 8/2002 | Jones et al. |
| 2002/0111998 A1 | 8/2002 | Kim |
| 2002/0120726 A1 | 8/2002 | Padole et al. |
| 2002/0143862 A1 | 10/2002 | Peterson |
| 2002/0147000 A1 | 10/2002 | Holmes-Kinsella |
| 2002/0162029 A1 | 10/2002 | Allen et al. |
| 2002/0188556 A1 | 12/2002 | Colica et al. |
| 2003/0005287 A1* | 1/2003 | Wray et al. .................. 713/155 |
| 2003/0028762 A1 | 2/2003 | Trilli et al. |
| 2003/0163708 A1 | 8/2003 | Tang |
| 2003/0182421 A1 | 9/2003 | Faybishenko et al. |
| 2004/0049587 A1 | 3/2004 | Henaff et al. |
| 2004/0148525 A1 | 7/2004 | Aida et al. |
| 2004/0158574 A1 | 8/2004 | Tom et al. |
| 2004/0172561 A1 | 9/2004 | Iga |
| 2004/0215788 A1 | 10/2004 | Morris |
| 2004/0230831 A1 | 11/2004 | Spelman et al. |
| 2004/0236702 A1* | 11/2004 | Fink et al. ..................... 705/73 |
| 2004/0242200 A1 | 12/2004 | Maeoka et al. |
| 2004/0243802 A1 | 12/2004 | Jorba |
| 2005/0022020 A1 | 1/2005 | Fremberg |
| 2005/0033833 A1 | 2/2005 | Baldiga et al. |
| 2005/0044385 A1 | 2/2005 | Holdsworth |
| 2005/0075992 A1* | 4/2005 | Gavan et al. .................. 706/10 |
| 2005/0114530 A1 | 5/2005 | Mangalik et al. |
| 2005/0138362 A1 | 6/2005 | Kelly et al. |
| 2005/0166053 A1 | 7/2005 | Cui et al. |
| 2005/0182660 A1 | 8/2005 | Henley |
| 2005/0268107 A1 | 12/2005 | Harris et al. |
| 2005/0273442 A1 | 12/2005 | Bennett et al. |
| 2006/0004558 A1 | 1/2006 | Bankes |
| 2006/0010072 A1 | 1/2006 | Eisen |
| 2006/0026692 A1 | 2/2006 | Lakhani |
| 2006/0069697 A1 | 3/2006 | Shraim et al. |
| 2006/0553095 | 3/2006 | Koch et al. |
| 2006/0080536 A1 | 4/2006 | Teppler |
| 2006/0129835 A1 | 6/2006 | Ellmore |
| 2006/0200855 A1 | 9/2006 | Willis |
| 2006/0235796 A1 | 10/2006 | Johnson et al. |
| 2007/0011724 A1 | 1/2007 | Gonzalez et al. |
| 2007/0073630 A1 | 3/2007 | Greene et al. |
| 2007/0113090 A1 | 5/2007 | Villela |
| 2008/0020738 A1 | 1/2008 | Ho et al. |
| 2008/0052091 A1 | 2/2008 | Vawter |
| 2008/0059380 A1 | 3/2008 | Bleahen |
| 2008/0063161 A1 | 3/2008 | Joyce et al. |
| 2008/0065892 A1 | 3/2008 | Bailey et al. |
| 2008/0083017 A1 | 4/2008 | Lulich et al. |
| 2008/0104070 A1 | 5/2008 | Lonchar et al. |
| 2008/0104672 A1 | 5/2008 | Lunde et al. |
| 2008/0104684 A1 | 5/2008 | Lunde et al. |
| 2008/0167888 A1 | 7/2008 | Keithley |
| 2008/0167966 A1 | 7/2008 | Ramsdale et al. |
| 2008/0174603 A1 | 7/2008 | Brass et al. |
| 2008/0281733 A1 | 11/2008 | Kubo et al. |
| 2008/0288405 A1 | 11/2008 | John |
| 2008/0318548 A1 | 12/2008 | Bravo et al. |
| 2009/0006861 A1 | 1/2009 | Bemmel |
| 2009/0013399 A1 | 1/2009 | Cottrell |
| 2009/0031131 A1 | 1/2009 | Qiu et al. |
| 2009/0089869 A1 | 4/2009 | Varghese |
| 2009/0119194 A1 | 5/2009 | Chau et al. |
| 2009/0134215 A1 | 5/2009 | Drummond et al. |
| 2009/0259588 A1 | 10/2009 | Lindsay |
| 2009/0265198 A1* | 10/2009 | Lester et al. ...................... 705/7 |
| 2009/0271306 A1 | 10/2009 | Pierson |
| 2010/0269168 A1* | 10/2010 | Hegli et al. .................... 726/11 |
| 2011/0022483 A1 | 1/2011 | Hammad |
| 2011/0295722 A1* | 12/2011 | Reisman ..................... 705/27.1 |
| 2012/0030083 A1 | 2/2012 | Newman et al. |

FOREIGN PATENT DOCUMENTS

| | | |
|---|---|---|
| CN | 1469583 | 1/2004 |
| GB | 2420192 | 5/2006 |
| JP | 2007-052688 | 3/2007 |
| JP | 2007-087079 | 4/2007 |
| KR | 10-2006-0060521 | 6/2006 |
| WO | 99/66378 | 12/1999 |
| WO | 2005125073 | 12/2005 |
| WO | 2008042871 | 4/2008 |
| WO | 2008052128 | 5/2008 |
| WO | 2008052132 | 5/2008 |
| WO | 2008082672 | 7/2008 |
| WO | 2008130440 | 10/2008 |
| WO | 2009134941 | 11/2009 |

OTHER PUBLICATIONS

English Translation, CN1469583, Method for Sharing User Authentication Information among Different Application System in the Internet, Published Jan. 21, 2004.

Office Action, U.S. Appl. No. 11/840,124, Aug. 27, 2009.

Office Action, U.S. Appl. No. 11/840,124, Mar. 5, 2010.

Chinese Patent Application No. 200580022148.4: Official Action issued from State Intellectual Property Office of The People's Republic of China on Oct. 9, 2010 with English translation attached thereto, 15 pages.

Chinese Patent Application No. 200580022148.4: Official Action issued from State Intellectual Property Office of The People's Republic of China on Mar. 8, 2010 with English translation attached thereto, 12 pages.

Chinese Patent Application No. 200580022148.4: Official Action issued from State Intellectual Property Office of The People's Republic of China on Jul. 3, 2009 with English translation attached thereto, 15 pages.

Chinese Patent Application No. 200580022148.4: Official Action issued from State Intellectual Property Office of The People's Republic of China on Sep. 5, 2008 with English translation attached thereto, 10 pages.

English Abstract of JP 2007-087079, obtained from espace.net on Janaury 6, 2011, 1 page.

English Abstract of JP 2007-052688, obtained from espace.net on Jan. 6, 2011, 1 page.

European Patent Convention Application No. 07844618.4: European Search Report issued from the European Patent Office on Apr. 9, 2010, 5 pages.

European Patent Convention Application No. 05758533.3: Official Action issued from the European Patent Office on Jun. 4, 2009, 10 pages.

European Patent Convention Application No. 05758533.3: European Search Report issued from the European Patent Office on Apr. 21, 2009, 2 pages.

(56) References Cited

OTHER PUBLICATIONS

International Patent Application No. PCT/US2009/042184: International Search Report dated Nov. 18, 2009, 3 pages.
International Patent Application No. PCT/US2007/082559: International Search Report dated Mar. 25, 2009, 3 pages.
International Patent Application No. PCT/US2007/082557: International Search Report dated Jun. 13, 2008, 2 pages.
International Patent Application No. PCT/US2007/082553: International Search Report dated Jun. 24, 2008, 2 pages.
International Patent Application No. PCT/US2007/080117: International Search Report dated Jul. 16, 2008, 3 pages.
International Patent Application No. PCT/US2005/026525: International Search Report dated Dec. 22, 2006, 3 pages.
International Patent Application No. PCT/US2005/021034: International Search Report dated Jun. 11, 2007, 2 pages.
U.S. Appl. No. 11/923,561, filed Oct. 24, 2007: Non-Final Office Action dated Sep. 15, 2010, 10 pages.
U.S. Appl. No. 11/923,572, filed Oct. 24, 2007: Non-Final Office Action dated Sep. 20, 2010, 10 pages.
U.S. Appl. No. 11/923,580, filed Oct. 24, 2007: Final Rejection dated Dec. 13, 2010, 9 pages.
U.S. Appl. No. 11/923,580, filed Oct. 24, 2007: Final Rejection dated Feb. 24, 2010, 7 pages.
U.S. Appl. No. 11/863,603, filed Sep. 28, 2007: Notice of Allowance dated Dec. 16, 2008, 6 pages.
U.S. Appl. No. 11/863,603, filed Sep. 28, 2007: Non-Final Office Action dated Jun. 17, 2008, 8 pages.
U.S. Appl. No. 11/840,124, filed Aug. 16, 2007: Non-Final Office Action dated Aug. 17, 2010, 9 pages.
U.S. Appl. No. 10/867,871, filed Jun. 14, 2004: Notice of Allowance dated Jul. 12, 2007, 4 pages.
U.S. Appl. No. 10/867,871, filed Jun. 14, 2004: Non-Final Office Action dated Mar. 23, 2007, 5 pages.
Yee, et al., "Passpet: Convenient Password Management and Phishing Protection," ACM 2006, SOUPS, 12 pages.
Restriction Requirement received in U.S. Appl. No. 11/840,124, dated Mar. 5, 2010, 6 pages.
Restriction Requirement received in U.S. Appl. No. 13/230,508, dated Aug. 9, 2012, 6 pages.
Final Rejection received in U.S. Appl. No. 11/840,124, dated Mar. 11, 2011, 18 pages.
Final Rejection received in U.S. Patent Reexamination Control No. 90/011,499, dated Feb. 17, 2012, 10 pages.
Non-Final Action received in U.S. Patent Reexamination Control No. 90/011,499, dated Jul. 29, 2011 11 pages.
Notice of Intent to Issue a ReExam received in U.S. Patent Reexamination Control No. 90/011,499, dated May 21, 2012, 6 pages.
Determination—ReExam Ordered received in U.S. Patent Reexamination Control No. 90/011,499, dated Apr. 29, 2011, 13 pages.
International Search Report received in International Application No. PCT/US2005/021034, dated Jun. 11, 2007, 2 pages.
Official Action issued by SIPO of China in Chinese Publication No. 101142570, dated Aug. 12, 2011, 7 pages.
Official Action issued by SIPO of China in Chinese Publication No. 101142570, dated Oct. 9, 2010, 24 pages.
Official Action issued by SIPO of China in Chinese Publication No. 101142570, dated Mar. 8, 2010, 19 pages.
Official Action issued by SIPO of China in Chinese Publication No. 101142570, dated Jul. 3, 2009, 24 pages.
Official Action issued by SIPO of China in Chinese Publication No. 101142570 (English translation provided by associate only), dated Oct. 8, 2008, 10 pages.
Canadian Patent Application No. 2667233, Official Action issued by CIPO dated Mar. 25, 2011, 3 pages.
Canadian Patent Application No. 2667279, Official Action issued by CIPO dated Apr. 11, 2012, 2 pages.
Conti, et al., "Visual Exploration of Malcious Network Objects Using Semantic Zoom, Interactive Encoding and Dynamic Queries," IEEE, Workshop on Visualization for Computer Security, Oct. 26, 2005, pp. 83-90.
Eick, et al., "Visualizing Corporate Data," Jan. 1996, AT&T Technical Journal, pp. 1-25.
Eick, et al., "Visualizing Corporate Data," 1997, IEEE, pp. 6-11.
European Patent Convention Application No. 07844618.4, Supplemental European Search Report issued from EPO on Mar. 30, 2010, 2 pages.
International Patent Application No. PCT/US2005/021034, Written Opinion and International Preliminary Report on Patentability of the International Searching Authority dated Jun. 11, 2007, 4 pages.
International Patent Application No. PCT/US2007/026525, Written Opinion and International Preliminary Report on Patentability of the International Searching Authority dated Nov. 30, 2009, 5 pages.
International Patent Application No. PCT/US2007/080117, Written Opinion and Preliminary Report on Patentability of the International Searching Authority dated Jul. 16, 2008, 6 pages.
International Patent Application No. PCT/US2007/082553, Written Opinion and Preliminary Report on Patentability of the International Searching Authority dated Jun. 24, 2008, 4 pages.
International Patent Application No. PCT/US2007/082557, Written Opinion and International Preliminary Report on Patentability of the International Searching Authority dated Jun. 13, 2008, 4 pages.
International Patent Application No. PCT/US2007/082559, Written Opinion and International Preliminary Report on Patentability of the International Searching Authority dated Mar. 25, 2009, 4 pages.
International Patent Application No. PCT/US2009/042184, Written Opinion of International Searching Authority dated Nov. 18, 2009, 3 pages.
International Patent Application No. PCT/US2009/042184, International Preliminary Report on Patentability dated Nov. 2, 2010, 1 page.
List of Pending Claims for Chinese Patent Application No. 200580022148.4 filed Jun. 14, 2005, 7 pages.
Listing of Pending Claims for Japanese Application No. 2007/516658, which is the National phase of International Application No. PCT/US2005/021034, filed Jun. 14, 2005, 7 pages.
Livnat, et al., "A Visualization paradigm for Network Intrusion Detection," Jun. 2005, IEEE, pp. 30-37.
Notification for Patent Registration Formalities for Chinese Application No. 200580022148.4 dated Jan. 19, 2012, 4 pages.
Japanese Patent Application No. 2007-516658, Notice of Reasons for Rejection dated May 27, 2011, 3 pages.
Japanese Patent Application No. 2007-516658, Notice of Reasons for Rejection dated Jul. 12, 2012, 6 pages.
Pimpler, "Google Maps API—The New World of Web Mapping," Apr. 2006, Geospatial Training & Consulting, LLC, pp. 1-44.
U.S. Appl. No. 11/923,561, Advisory Action dated Jun. 8, 2011, 3 pages.
U.S. Appl. No. 11/923,561, Final Rejection dated Mar. 30, 2011, 10 pages.
U.S. Appl. No. 11/923,561, Non-Final Office Action dated Jan. 19, 2012, 16 pages.
U.S. Appl. No. 11/923,561, Final Rejection dated Aug. 16, 2012, 13 pages.
U.S. Appl. No. 11/923,572, Final Rejection dated May 9, 2011, 14 pages.
U.S. Appl. No. 11/923,572, Non-Final Office Action dated Jun. 4, 2012, 11 pages.
U.S. Appl. No. 11/923,580, Final Rejection dated Dec. 13, 2010, 9 pages.
U.S. Appl. No. 11/923,580, Non-Final Office Action dated Jun. 7, 2011, 10 pages.
U.S. Appl. No. 11/923,580, Non-Final Office Action dated May 24, 2012, 8 pages.
U.S. Appl. No. 12/432,714, Non-Final Office Action dated Mar. 30, 2011, 15 pages.
U.S. Appl. No. 12/432,714, Final Rejection dated Nov. 28, 2011, 15 pages.
U.S. Appl. No. 13/085,418, Non-Final Office Action dated May 22, 2012, 19 pages.
U.S. Appl. No. 12/432,714, filed Apr. 29, 2009.
U.S. Appl. No. 11/923,572, filed Oct. 24, 2007.
U.S. Appl. No. 11/840,124, filed Aug. 16, 2007.
U.S. Appl. No. 13/230,508, filed Sep. 12, 2011.
U.S. Appl. No. 11/923,580, filed Oct. 24, 2007.

(56) References Cited

OTHER PUBLICATIONS

U.S. Appl. No. 11/923,561, filed Oct. 24, 2007.
U.S. Appl. No. 11/964,572, filed Dec. 26, 2007.
U.S. Appl. No. 13/085,418, filed Apr. 12, 2011.
Canadian Patent Application No. 2,570,045: Examiner's Report issued from Canadian Intellectual Property Office on Jan. 11, 2013, 2 pages.
English translation provided by Yuasa and Hara of Japanese Patent Application No. 2007-516658: Notice of Reason for Rejection issued from Japanese Intellectual Property Office on Jul. 12, 2012, 6 pages.
U.S. Appl. No. 13/085,418, filed Apr. 12, 2011: Final Office Action dated Oct. 15, 2012, 19 pages.
U.S. Appl. No. 13/230,508, filed Sep. 12, 2011: Non-Final Office Action dated Jan. 29, 2013, 15 pages.
Canadian Patent Application No. 2570045, Examiner's Report issued by CIPO dated May 31, 2012, 5 pages.
Chinese Office Action for Application Serial No. 2011080900572420 dated Aug. 12, 2011, 4 pages.
Information Disclosure Statement Trasmittal Letter filed herewith on May 30, 2013, 2 pages.
Non-Final Office Action dated Mar. 1, 2013, received in U.S. Appl. No. 11/923,572, 12 pages.
Non-Final Office Action dated Mar. 7, 2013, received in U.S. Appl. No. 13/085,418, 18 pages.
Notice of Allowance dated May 7, 2013, received in U.S. Appl. No. 11/923,572, 10 pages.
Notice of Allowance received in U.S. Appl. No. 11/923,572, dated Jan. 7, 2014.
Non-Final Office Action issued in U.S. Appl. No. 13/230,508, dated Dec. 19, 2013.
Final Office Action issued in U.S. Appl. No. 13/230,508, dated Jul. 23, 2013.
Non-Final Office Action issued in U.S. Appl. No. 13/763,422, dated Aug. 16, 2013.
Notice of Allowance issued in U.S. Appl. No. 13/085,418, dated Oct. 23, 2013.
Notice of Allowance issued in U.S. Appl. No. 11/923,572, dated Sep. 13, 2013.
Office Action issued in Canadian Patent Application No. 2,667,279, dated Nov. 15, 2013.
Flaim, Denise, "The E-Shopper/If Security Fails, Disaster Isn't Always in the Cards," Newsday (Long Island, N.Y.), Section C07; May 23, 2001.
Gordon, Marcy; "SEC Beefing Up Internet Surveillance- Automated System to Search for Telltale Words, Phrases that Could Indicate Fraud," Journal Star (Peoria, IL); Section A07; Mar. 29, 2000.
Keefe et al., "E-Mail Scam Cites Bogus 'Fraud Alert' from Best Buy," Palm Beach Post (West Palm Beach, FL); Section 6A; Jun. 21, 2003, (Abstract only).

\* cited by examiner

NETWORK SECURITY AND FRAUD DETECTION SYSTEM AND METHOD

PRIORITY CLAIM

This application is a continuation in part and claims priority under 35 USC 120 to U.S. patent application Ser. No. 10/867,871, filed on Jun. 14, 2004 now U.S. Pat. No. 7,272,728 entitled "Network Security and Fraud Detection System and Method" which is incorporated herein by reference.

FIELD OF THE INVENTION

The present invention relates generally to the field of network security, including detection and prevention of fraudulent transaction and identity theft. By sharing information about associations between end-users and one or more reputation factors, such as a unique network device identifier, the present invention has other potential uses that include, but are not limited to, content distribution, hardware authentication, protection against piracy of software and other electronic media, monitoring customer behavior, target marketing, and customer relationship management.

BACKGROUND OF THE INVENTION

The continued growth of telecommunications infrastructure and proliferation of network devices, service providers, wireless technology and related software products have transformed the Internet into a tool for everyday use. Businesses are increasingly using the Internet as a method of communicating with customers, vendors, employees and shareholders and conducting business transactions. In theory, conducting business on the Internet is often efficient and cost effective, particularly when products and services can be distributed electronically. In practice, damage caused by hackers, identity theft, stolen credit cards, and other fraudulent activities can be enormously expensive and difficult to manage. At a minimum, these realities significantly increase the risks and costs associated with conducting business over the Internet specifically, and generally over any type of network.

While a number of methods are commonly used to make it safer to use the Internet and facilitate communication and business transactions, they all have inherent and exploitable weaknesses. Login names and passwords are one of the most widely used and accepted forms of basic network security, where access is limited to an exact match of a login and password combination. The identification of valid login names is often trivial, particularly on networks where logins are visible to observers and in organizations where users have a common login format, such as "firstinitial_lastname". Since end-users often use common, simple and default passwords, share passwords, and write down more complicated passwords, passwords can be guessed, requested, or observed. Thus, the user name and password combination provides only a basic level of security and should not be relied upon exclusively, particularly to guard networks accessible via the Internet.

A secondary user authentication system goes a step beyond reliance on just user name and password and can greatly increase security. The secondary authentication relies on something the user has in their possession, such as a special purpose hardware device. For example, after entering a valid user name and password to access a network, a user may be given a code as part of the login process. The user enters the code into a device within a specified amount of time, and the device provides a secondary code/password for the user to enter as part of the login process. While significantly more secure, these systems are not perfect. More importantly, these systems can be impractical in protecting large networks accessible by the general public, and create significant barriers to entry.

A hardware key, sometimes referred to as a "dongle" that might be connected to a computer by a USB port, is sometimes used to identify end-users connecting from a particular device. A fixed system component serial number and other hardware methods used to uniquely identify a specific network devices are also used to limit access to 'known' devices. Unfortunately, these methods can be copied and simulated in software. These systems also create barriers and can be impractical in protecting large networks accessible by the general public.

The use of digital certificates and Trusted Third Party Certificate Authorities are increasingly popular methods of ensuring that the party connecting to a network is indeed who they claim to be. Unfortunately, certificates can be copied and even stolen remotely. Moreover, significant trust must be placed in third party verification groups that do not have a direct vested interest in the networks relying upon them. The requirement for network users to utilize certificates can also create a significant barrier, particularly for large networks accessible by the general public, and create significant barriers to entry.

An Internet Protocol (IP) address and geo-location services relying upon IP address are sometimes used to verify end-users or at least to cross reference likely physical location with known information about a user. These methods are limited by the fact that many Internet users obtain a new temporary IP address every time they connect to the Internet. Moreover, using IP addresses to pinpoint the actual location of a connected device is inherently flawed by the nature in which blocks of IP numbers are distributed and the relative ease of IP spoofing, a technique used by network intruders to make it appear that they are connecting from a trusted or different IP address.

The negative credit card databases and lists of identities used in fraudulent activities are reasonable screening tools and should be used to the extent that they are cost effective. However, such lists can never be relied upon exclusively because it is practically impossible for such lists to be up-to date and comprehensive. In addition, these lists offer absolutely no protection against so-called 'friendly charge backs', declined payments by credit card holders that make purchases using their own valid credit card who later claim that they did not make the purchase.

Screening services, such as RiskGardian provided by TrustMarque, and other risk assessment services are also reasonable screening tools and should be used to the extent that they are cost effective. These services utilize little concrete information about a specific user or device and only assign relative risks associated to a particular transaction based upon general information and trends. Finally, such services rely exclusively on historical trends and are poor at identifying new problems and emerging risk areas.

Fingerprints, voice recognition, retinal scans, face recognition, DNA, and other biometric identification methods will become increasingly more common. At this time, these methods of user identification are substantially cost prohibitive. Moreover, one or more of these methods must be widely distributed and generally accepted by end-users for consideration and use by most organizations conducting business over the Internet. Even if such a method was available and cost effective, once unique biometric identifiers are converted into electronic information, they too can be stolen, copied and otherwise compromised.

While all of these methods and others have their weaknesses and can be exploited, each has a place in network security. The types of access, level of security, nature of user populations, and other factors will dictate which group of methods will best serve each application. The present invention is not intended to replace any of these means of protecting networks and screening out unauthorized users. Organizations should use any and all cost effective means at their disposal to screen network access. The present invention enhances security by providing capabilities undeliverable by any other of the above typical systems and methods. Thus, it is desirable to provide a network security and fraud detection system and method and it is to this end that the present invention is directed.

SUMMARY OF THE INVENTION

These and other objects are achieved by a system that uniquely identifies network devices connecting to a network, and correlates logins with each network device used. This information can be used to observe login behavior, such as accounts connecting from 'too many' devices, or 'too many' accounts connecting from the same device. In addition, this information can be used to cross-reference physical devices used by known fraudulent accounts, and cross-reference other accounts used by specific devices. Physical devices involved in suspicious or fraudulent activity, or devices associated with accounts involved in suspicious activity can be prevented from connecting to a network. Finally, this information can be shared with other networks utilizing the system. In this way, physical devices associated with suspicious or fraudulent activity on one network could be denied access to other networks, based on the business rules and risk tolerance parameters of each individual network.

The system is an advanced fraud detection and prevention tool that can significantly reduce the risk of Internet transaction and identity fraud since the system allows a business to avoid "problem customers" identified by other participating businesses before they start creating problems for that business, and it eases the process of identifying potential repeat offenders before they create more problems. To accomplish this goal, the system uniquely identifies end-customers as well as their association with one another. The system tracks end-customers behavior over time, identifies 'suspicious' behavior based on parameters established by network service providers, and maintains status for device and end-user associations. This information is shared by all participating businesses so that a business can make the most educated decisions about new and existing customers based on the network devices they use and the history of those devices with other businesses. In a preferred embodiment, the fraud detection and prevention system is comprised of three major real-time components including a server, a client and a set of application programming interfaces (APIs). The server contains a centralized database of fraud history that is maintained. The client is a small executable program (having a plurality of lines of code) that 'registers' a network device with the server. The client may be contained within a program distributed by a network service provider that must be used to connect to the network. The client may also be delivered through a standalone application, imbedded within a common software product like a web browser, or even imbedded in hardware or memory, any of which would be required to be running when a connection to a network is authenticated by a network service provider protected by this system. The client could also be delivered on demand, through a JavaScript, ActiveX control, or similar technology as a user connects to a network service provider through their favorite web browser. For example, a gambling site might have a new user download a software application that generates a poker table user interface and logic and the client of the fraud detection and prevention system is part of that downloaded software application. The API ("ieSnAPI" in a preferred embodiment) is a set of tools that a back-end system of a network service provider (that uses the fraud detection and prevention system) uses to communicate with the system. In addition to the three real-time components, the system further comprises two administrative components including Web Admin Pages and a reports module. The Web Admin Pages may permit a user of the system to tune its fraud tolerance levels, inspect and change individual customers' fraud status, and check customers' relationships to one another. The reports will keep a business apprised of existing customers who have new fraud activity as well as the usage of the system.

In accordance with the invention, a network security and fraud detection and prevention system and method are provided. The system may have one or more network service providers that provides a service and a network device that connects to at least one of the network service providers over a communications network to use the provided service. At least one of the network service providers further comprises a fraud detector system. The fraud detector system has a client wherein the client gathers information about the network device to generate a device identifier that identifies the network device, a database, and a module that receives the device identifier, stores the device identifier in the database and associates the device identifier with one or more reputation factors to generate a reputation of the network device. Using the system and method, the reputation of the network device is shared between the one or more network service providers to detect fraud using the network device across the network service providers. The reputation factors may include, but are not limited to, one or more of end-user account information provided by the network service provider, a credit card account number of a user, a fingerprint of the user, an email address of the user, a phone number of the user, a physical address of the user, a cellular phone number of the user or any other information about the user that contains evidence of the reputation of the user.

In accordance with another aspect of the invention, a computer based user account authentication system and method are provided. The system comprises one or more network service providers that provides a service and a first network device that connects to at least one of the network service providers over a communications network to use the provided service. At least one network service provider has a fraud detector unit. The fraud detection unit has a client wherein the client gathers information about the network device to generate a device identifier that identifies the network device, a database and a module that receives the device identifier, stores the device identifier in the database and associates the device identifier with end-user account information provided by the network service provider. The fraud detection system also has a user account module that compares the device identifier for the first network device with a list of one or more network devices approved to access the user account stored in the database determines if the first network device accesses the user account based on the list of approved network devices.

DETAILED DESCRIPTION OF A PREFERRED EMBODIMENT

Figure 1:
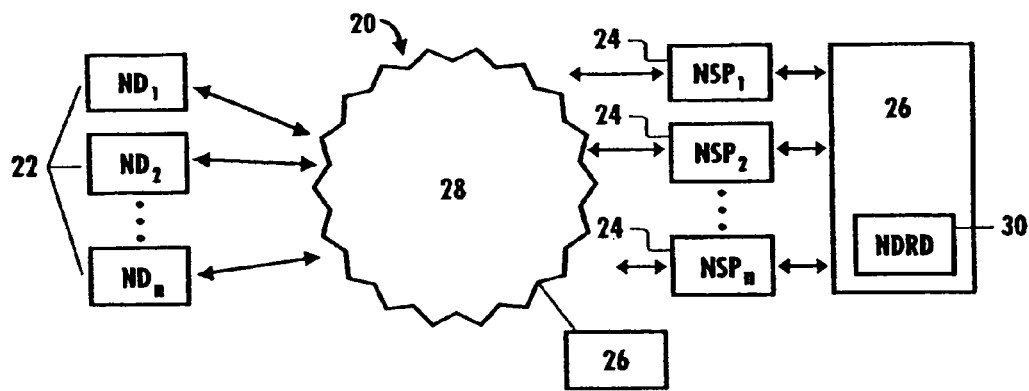
FIG. 1 is a diagram illustrating a computer-implemented electronic transaction network having one or more network devices being connected to one or more network service providers that share fraud information with a fraud detection server that is part of the fraud detection system in accordance with the invention.

The invention is particularly applicable to an electronic transaction fraud detection system and method and it is in this context that the invention will be described. It will be appreciated, however, that the system and method in accordance with the invention has greater utility, such as to any type of transaction in which it may be desirable to detect fraud being carried out by one or more network devices and user accounts over a communications network, or even detecting and preventing potential fraud or identity theft by individuals trying to complete a transaction remotely by phone or mail, or even in person. An important aspect of this system and method is to associate two pieces of information about a transaction, monitor these associations for all customers, and share status information about these associations with other businesses. Illustrated below is the use of this system to correlate a physical device and a user. In accordance with the invention, the associating of any combination of factors/pieces of information including but not limited to customer identifier, phone number, drivers license number, social security number, mailing address, ship to address, credit card number, email address, network device, retail purchase location, and any other information captured as part of a purchase could be used to identify and minimize transaction fraud and identity theft. One of the most important aspects of the invention is creating associations, tracking behavior over time, and sharing information with multiple networks or businesses that stand to benefit from sharing this type of information. In this way, fraudulent activity can be identified and stopped within one network/business and prevented in others that share information through this fraud prevention system. For purposes of illustration, a specific example of the fraud detection system in the context of an on-line gambling web site will be described. In accordance with the invention, the system in accordance with the invention may utilize 1) both a network device identifier (NDI) and a network device fingerprint (NDF) to identify a network device; 2) only an NDI to identify a network device; 3) only an NDF to identify a network device; or 4) any other data that may be used to uniquely identify a network device. The information used to identify a network device may be known as a device identifier. In some situations, it may be impossible to extract data from a network device so that only the NDI is used to identify the network device. In other situations, the other data that is used to identify the network device may be a phone number of a caller to a phone ordering system or an identifier for a cellular phone. For purposes of illustration, an example is provided below (See FIGS. 1-9F) in which the reputation of a network device is tracked and used to identify fraud wherein an NDI and an NDF are used together to identify a network device. In accordance with the invention, the system may also implement multi-factor reputations discussed below or, as shown in FIG. 10, may be used to control access to an end user account.

FIG. 1 is a diagram illustrating a computer-implemented electronic transaction network 20 having one or more network devices (ND1, . . . , NDn) 22 being connected to one or more network service providers (NSP1, . . . , NSPn) 24, also referred to as hosts, that share fraud information with a fraud detection server 26 that is part of the fraud detection system in accordance with the invention. As shown in FIG. 1, the fraud detection server 26 may be interconnected to the network service providers over a private network or may be interconnected to the network service providers over a communications network 28, such as the Internet or World Wide Web or any other network that is capable of communicating digital data, such as a wireless or cellular network. If the fraud detection server 26 is connected to the communications network 28, then the data between the network service providers 24 and the fraud detection server 26 may be encrypted or travel over a virtual private network to ensure privacy and security. The fraud detection server may also be known as a reputation authority since the fraud server will assess the reputation of each network device (in the embodiment shown in FIGS. 1-9F) or the reputation of each user account using multiple reputation factors. For the embodiment shown in FIGS. 1-9F, a device reputation authority is maintained in a device registration database (device reputation) described below. However, the invention is more broadly a reputation authority that can assess and share the reputation of various devices/accounts/end-users and the teachings below about the device reputation authority can be easily extended to other applications that are within the scope of this invention.

As shown in FIG. 1, each network device may connect to any network service provider 24 over the communications network 28 using well known data protocols such as HTTP, HTTPS and the like. In the system shown in FIG. 1, each network service provider may be providing a service to each network device connected to it and may perform an electronic transaction with each network device, such as a bet in gambling game or a purchase of a product. In accordance with the invention, each electronic transaction is susceptible to fraud and each network device and its user must be uniquely identified to reduce the risk of fraud. Thus, the fraud detection server 26 may receive unique user identification information from each network service provider as well as generate a unique network device identifier that uniquely identifies each network device. Using the unique user identification information and unique network device fingerprint in accordance with the invention, the fraud detection server 26 is able to detect fraudulent activities across the electronic transaction network 20. In particular, the fraud server 26 may provide a centralized service utilizing this invention to uniquely identify physical devices, register unique devices, track end-user logins, associate an end-user account with one or more specific devices, associate a device with one or more end-user accounts, and share this information with each network service provider. The fraud server 26 may include a centralized Network Device Registration Database (NDRD) 30. More details of the fraud server and the fraud detection system in accordance with the invention will be described below with reference to FIGS. 4-7.

The network device 22, for example, may be a personal computer, server computer, laptop computer, personal digital assistant (PDA) such as a Palm-based device or Windows CE device, a cellular phone, a wireless device such as a wireless email device or other device capable of communicating wirelessly with a computer network or any other computing resource that has the processor, memory and input/output capabilities to be able to communicate with a computer network and handle electronic transactions. The network device may also be a telephone of a user used, for example, to order items from a mail order catalog. In operation, a network device, such as ND1, may request access to the electronic transaction network 20 and a particular network service provider, such as NSP1 in this example. To gain access to the NSP, complete a transaction, or access a particular part of the network, a user must log in through a network device. The NSP may then pass an end-user account identifier (EAI) onto the fraud server 26. A client program on the network device may generate a network device fingerprint (NDF) for the network device (unless a fingerprint has already been assigned to that network device) and sends that NDF to the fraud server. The fraud server stores the EAI and NDF in the NDRD 30. Based on the EAI and NDF, as described below in more detail, the likelihood of fraud being committed by the particular end-user with the network device ND1 is determined and an appropriate action is taken. Assuming the network device ND1 is granted access to the network 20, the network device performs its electronic transaction. If a fraudulent activity occurs during that electronic transaction, that information is also stored in the NDRD 30. In this manner, the one or more network service providers 24 share fraud information between each other selectively (as described below in more detail) so that a fraud committed against one network service provider is logged into and tracked by the fraud detection system in accordance with the invention. Thus, a user or network device that has committed fraudulent activities is tracked even when the user or network device logs into a different network service provider. Therefore, the fraudulent activities of a user or network device are tracked across the electronic transaction system 20. Now, each network device will be described in more detail.

Figure 2:
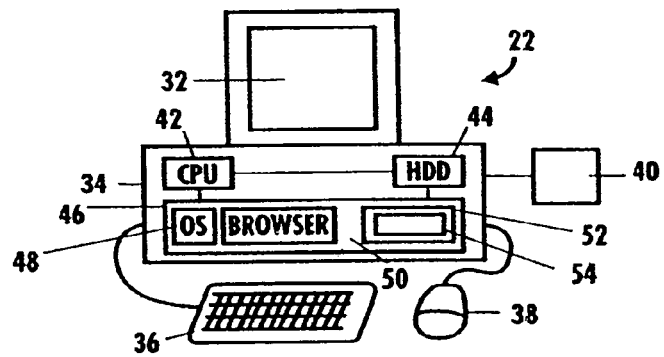
FIG. 2 is a diagram illustrating an example of a network device in accordance with the invention.

FIG. 2 is a diagram illustrating an example of a network device 22 in accordance with the invention. In this example, the network device is a personal computer. In this example, the network device has a display device 32, such as cathode ray tube or liquid crystal display, for displaying information and (optionally images) to the user of the network device, a chassis 34 and one or more input/output devices to permit the user to communicate with the network device and to permit the network device to communicate with the outside world, such as a keyboard 36, a mouse 38 and a device 40 for connecting to and communications with a communications network, such as a network interface card, cable modem, a DSL modem, wireless modem, telephone line modem, etc. . . . The network device 22 further comprises one or more processors 42, a persistent storage device 44, such as a optical tape drive, optical drive, a hard disk drive, flash memory etc. that stores data even when the computer system is powered down and a memory 46, such as SRAM, DRAM, SDRAM, etc. that temporarily store data being executed by the processor and which typically lose data when the computer system is powered down. Typically, when the processor is executing the instructions of a computer program or processing data based on those instructions, the instructions and data are loaded into the memory 46. Thus, when the network device is communicating with the electronic transaction system 20, the memory may store a operating system (OS) 48, a browser application 50 and a downloaded software package 52 wherein each of these are software program having a plurality of lines of instructions that cause the network device to perform a particular function. For example, the operating system 48, such as Windows 2000, may operate to display a graphical user interface to the user and permit the user to execute other computer programs, such as the browser application 50 and one or more downloaded software packages 52. The browser application, such as Netscape Navigator or Microsoft Internet Explorer, when executed by the processor, permits the user to access the World Wide Web as is well known. In this example, the network device 22 may connect to the network service providers (also known as hosts) using the downloadable application 52 distributed by each Host. For example, to connect to Host 1, users must login through Client Software Package 1 and to connect to Host 2, users must login through Client Software Package 2, etc. In accordance with the invention, each downloaded software package may include a small client program 54 that executes on the network device and, among other things, performs some fraud preventing and detection functions and generates the network device fingerprint in accordance with the invention as described below.

In accordance with the invention, embedded in each Client Software Package is a small piece of software that performs a portion of a common Network Device Registration Method (NDRM) that is described in more detail below with reference to FIG. 7. In the example shown in FIG. 1, each Host represents a different private network environment operated by independent organizations that do not share end-user identities. Also in this example, the centralized NDRD 30 used by each Host is remotely located at the fraud server 26 and is a service provided by a third party. Those skilled in the art will appreciate that the NDRM may be implemented in various different manners that are within the scope of this invention. For example, the NDRM may be distributed across a plurality of computing devices (with no central fraud server 26 and no central NDRD) wherein the computing devices, such as a combination of the network devices and network service providers, each perform part of the functions of the fraud detection and preventing system in accordance with the invention. Alternatively, the NDRM may be embedded in a custom application, embedded in the browser application or other common application(s) or in firmware. Furthermore, the NDRM may be a stand alone application or executed remotely and all of these examples of the NDRM are within the scope of the invention. Furthermore, the NDRM may be executed before, after and/or during connection to a network or at periodic intervals, with all combinations of which are within the scope of the invention.

The NDRM in accordance with the invention may be customized for different network device types. For example, with a personal computer that connects to a NSP, the NDRM may use the NDI and NDF to identify the network device. With a cellular phone, it is typically possible to extract data from the cellular phone, such as its serial number, so that an NDF only may be used to identify the cellular phone network device. For a personal digital assistant (PDA) network device, it is typically possible to put data/information onto the PDA only so that the NDI only may be used to identify the PDA. As another example, a PC using Linux would require a different client than a Windows-based PC. In accordance with the invention, the NDRM may also be practiced in a situation in which a hardware device, such as a smart card or PCMCIA card, with a pre-loaded fraud client module on the card may be used in which the card has its own unique identifier that may be used to uniquely identify the card. Thus, the NDRM in accordance with the invention may be implemented in a variety of different manners. Now, more details of an exemplary network service provider (NSP) will be described.

Figure 3:
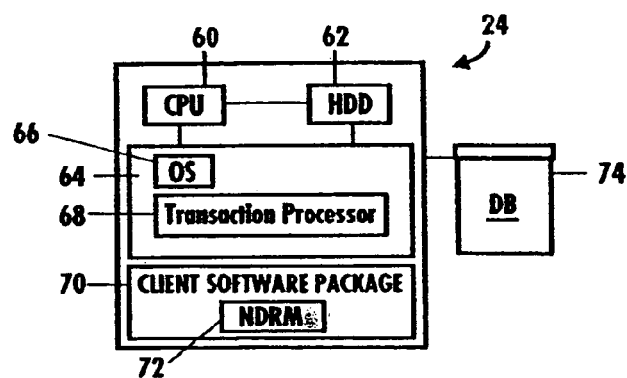
FIG. 3 is a diagram illustrating an example of a network service provider in accordance with the invention.

FIG. 3 is a diagram illustrating an example of a network service provider 24 in accordance with the invention. In this example, the network service provider may a one or more web-based server computer(s), such as a web server, an application server, a database server, etc., that are capable of communicating with a network device over a communications network, such as the Internet or a wireless network and is capable of downloading web pages or a software application to the network device. The network service provider 24 in this example comprises one or more processors 60, one or more persistent storage devices 62 such as those described above and a memory 64 such as described above. For the network service provider 24 to provide the services to the network devices, the memory may store (and the processor(s) may execute) a server operating system 64 and a transaction processing software system 68 to facilitate an electronic transaction between the network service provider 24 and one or more network devices. For example, the transaction processor may process bets at a gambling site or purchases at an e-commerce site. The network service provider 24 may further comprise a client software package 70 that is stored on the network service provider and then downloaded to each network device that desires to conduct a transaction with the particular network service provider. For example, the client software package may be a virtual poker table game, a virtual blackjack game, a virtual slot machine, an e-commerce user interface, etc . . . . In accordance with the invention, each client software package may include a client fraud detection module 72 (that may preferable be a plurality of lines of code and data) that is executed by each network device to implement the fraud detection and prevention system in this example. Each network service provider 24 may further comprise a database 74, such as a database server or a data structure stored in the memory of the network service provider, that stores the well known electronic transaction data for the network service provider. In one embodiment used as an example, the system utilizes an embedded fraud detection client 72. In one implementation of the system, the client is embedded into a proprietary software application for example so that the client may be contained within a program distributed by a network service provider that must be used to connect to the network. In another embodiment, the client may also be delivered through a stand-alone application, imbedded within a common software product like a web browser, or even imbedded in hardware or memory, any of which would be required to be running when a connection to a network is authenticated by a network service provider protected by this system. In another embodiment, the client could also be delivered on demand, through a JavaScript, ActiveX control, or similar technology as a user connects to a network service provider through their favorite web browser. In accordance with the invention, the system may be implemented without any client on the network device. For example, for a phone order or mail order system, the system may establish a unique identifier of the user based on a phone number in which the mail order operator may call the user back to verify that phone number and then use that phone number as the unique identifier for the user. In this case, an NDF (the phone number) is used by the system. Then, in accordance with the invention, the phone number may be stored in the database and then used as described below.

Thus, in accordance with the invention, the client 72, for the device on which it is installed, determines the status of the device (as already having a unique identifier or not) and controls the connection of the device to the network service provider. The network service provider controls each device and/or each user's access to the resources of the network service provider by, for example, denying access to a user or device as described below. Thus, the network service provider utilizes the device/user status provided by the client in order to effectively control network security and prevent fraud. Now, an example of the fraud detection server will be described.

Figure 4:
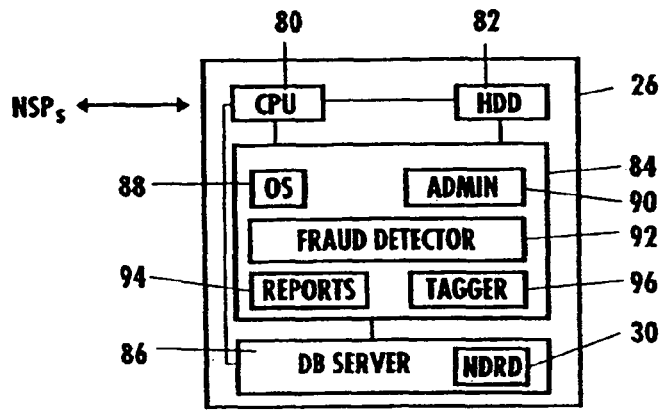
FIG. 4 is a diagram illustrating an example of the fraud detection server in accordance with the invention.

FIG. 4 is a diagram illustrating an example of the fraud detection server 26 in accordance with the invention. In this example, the fraud detection server 26 is a stand-alone computing resource, such as a server computer, with the NDRD 30, although the functions of the fraud server 26 and the NDRD 30 may be distributed as described above. The fraud server 26 may include one or more processors 80, one or more persistent storage devices 82 as described above and a memory 84 as described above. The fraud server may further include a database server/manager 86 that stores the NDRD 30 in accordance with the invention. The structure and operation of the processor, persistent storage device and memory are described above. The memory may store a server operating system 88, an administrator software module 90, a fraud detector software module 92, a reports software module 94 and a tagger software module 96 wherein each module comprises a plurality of instructions (and associated data) that are executed by the processor to implement the fraud detection and preventing system. In accordance with the invention, the client 72 downloaded to the device may perform the "tagging" of each device wherein the client may determine if the device already has a unique identifier from the server 26 or will request a new unique identifier. The server operating system is well known. The administrator module 90, in a preferred embodiment, may generate administrator web pages that permit the user of the fraud detection and prevention system to interact with the system using the web pages and configure the system. For example, the administrator web pages may permit the user to configure items of the system, adjust query items and update items. In configuring the items of the system, the user may toggle the master verify on and off wherein an OFF setting will always accept a new user or network device for access to the network. The user may also configure the maximum number of users (different, distinct user names) that can share a particular network device/results and the maximum number of network devices that a single user may use. If the maximum threshold set above is exceeded and the master verify is ON, then the fraud detection and prevention system may restrict access for the network device or user that has exceeded the threshold values. The user may also set whether a status of each user of a particular network service provider may influence the fraud detection operations, such as permitting account creation, permitting login, permitting a deposit into an account or permitting a withdrawl from an account. The administrator module also permits the user to configure the query items that extract information from the database of the fraud detection and prevention system. For example, the user may generate a query of, given a particular network device, what users have used that network device or a query that asks, given a particular user, what network devices have been used by the particular user. The user may also configure a query that asks, given a particular network device, what other network service providers set this network device to associate users/computers a predetermined number of levels deep or given a particular user, what is that user's current status in the system. The administrator module also permits configuration of the update items. For example, the user may set a particular network device to be always accepted for access to the system, set a certain network device to be accepted into the system, set a certain network device to be trapped by the system (to further determine the intentions of the network device), set a certain network device to be rejected by the system or set a given user to be always accepted by the system (e.g., all network devices associated with the user are always accepted). The user may also set a given user to be accepted for a predetermined interval or a predetermined access attempt (the network devices associated with the user are accepted), set a given user (and all of the network devices associated with the user) to be trapped or set a given user (and all of the network devices associated with the user) to be rejected. Hosts may set up any number of device and user status levels, and establish any number of behavior patterns, each of which might require a different action, such as notify a particular email address, page a particular number, deny access to the network, allow access but change the status of the device, etc.

The reports software module 94 permits a user to configure and generate reports from the fraud detection and prevention system and its database. For example, the system may generate a report showing the daily change report (with a list of the network devices whose status has changed), a third party fraud report listing the network devices that other network service providers know about and their status, or a shared computer report listing all of the network devices that have multiple user accounts associated with them. The reports module may also generate a multiple computer report listing the users that have used multiple network devices and the network devices used by each user and a usage report listing the number of administrator queries, administrator updates, API queries and number of network devices being tracked by the fraud detection system. The fraud detector software module 92 contains the instructions and logic, based on the data from the network devices and users, to determine the appropriate status of a particular user/network device and its access status into the electronic transaction system. In accordance with the invention, each network service provider may establish its own status rules. For example, a particular network service provider may establish a "Yes" or "No" to connect to the network service provider. As another example, a particular network service provider may have a "Yes to connect, but generate a score for the particular network device" status or a "Yes, but trap the information about the network device" status. The fraud detection logic is described below in more detail.

The tagger software module 96 contains the various software, logic and data to uniquely identify each network device (generate the identifier for a particular network device) that is making a connection to the electronic transaction system. The connection to the system may include, but are not limited to, an initial connection to the network, account set up, login, change to account information, deposit, withdrawal, purchase, randomly throughout connection to network, etc. In accordance with the invention, the actual method for tagging each network device may vary, as described below. In accordance with the invention, each network device is uniquely identified that each device is tracked within the system even when a different user logs into a Host with the same network device. Tagging individual network devices enables the fraud detection system to deny access to a Host for a particular user (regardless of the network device being used), for a particular network device (regardless of the user using the network device), for the combination of a particular user with a particular network device, or any combination of users and devices. Now, examples of the user database in each network service provider and the network device registration database of the fraud detection system will be described in more detail.

Figure 5:
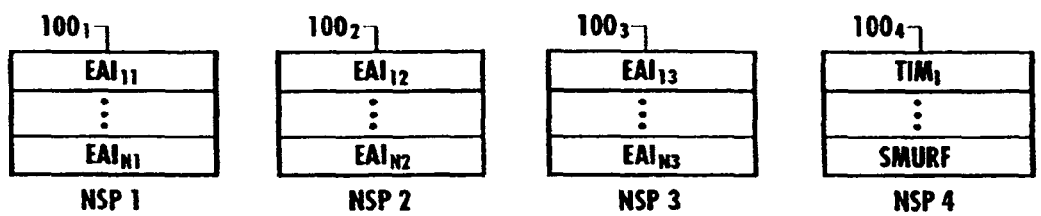
FIG. 5 illustrates examples of a portion of a database for each network service provider.

FIG. 5 illustrates examples of a portion of a database $100_1$, $100_2$, $100_3$, $100_4$ for each network service provider (NSP 1, NSP 2, NSP 3 and NSP 4) in an electronic transaction system that has four network service providers. In accordance with the invention, the information contained in these databases is forwarded onto the fraud detection system so that the fraud detection system can distinguish users of each network service provider from the users of other network service providers. Each network service provider has an end-user account identifier (EAI), such as $EA_{11}$-$EAI_{n1}$, $EAI_{12}$-$EAI_{n2}$, $EAI_{13}$-$EAI_{n3}$ and $EAI_{14}$-$EAI_{n4}$. In this example, NSP 1, NSP 2, and NSP 3 use a separate EAI that provides no information about the users account, whereas NSP 4 utilizes the end-user's actual UserID ("Tim1" and "Smurf") as the EAI. All that is required by the fraud system is that each host provides an EAI that has a direct relationship with a unique account on that host.

Figure 6:
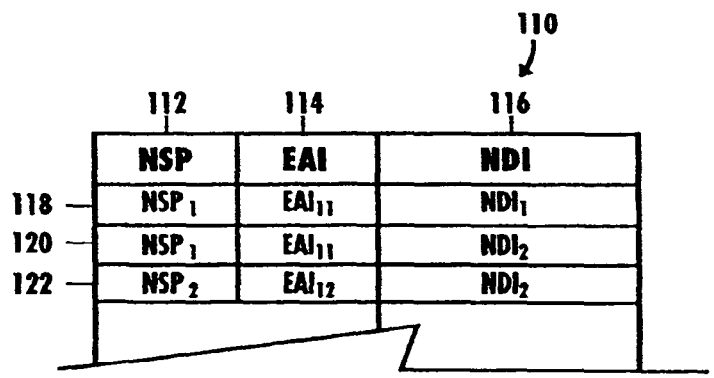
FIG. 6 is a diagram illustrating an example of a network device registration database in accordance with the invention.

FIG. 6 is a diagram illustrating an example of a populated network device registration database 110. In this example, the database is a database table containing the pertinent information. However, the data may be stored in different databases and different database data structures that are within the scope of this invention. In this example, the NDRD 110 may include a Host column 112, an EAI column 114 and a network device identifier (NDI) column 116 that permit the fraud detection system to associate a particular Host with a particular user and a particular network device. As described above, the EAIs represent end-user accounts that are unique to each Host. The network device identifiers (NDIs) represent unique network devices that have connected to at least one Host. The individual rows in the database table represent unique combinations of Host, EAIs and NDIs. For example, a first row 118 represents an $EAI_{11}$ to $Host_1$ from $NDI_1$ represents an account coming from a specific device (ND1) and attempting to connect to Host 1. If this same account connected to Host 1 from a different device, a new row 120 would be created, for example $EAI_{11}$ to $Host_1$ from $NDI_2$ so that the access by the same user via two different network devices is tracked and registered in the system. If the end-user represented by $EAI_{11}$ on $Host_1$ has an account with $Host_2$ (shown as $EAI_{12}$ since each Host has its own unique EAIs) and connects to $Host_2$ from $NDI_2$, a new entry 122 would be created, such as $EAI_{12}$ to $Host_2$ on $NDI_2$ so that the same user connecting to a different network service provider with the same network device is tracked and registered in the fraud system. A great deal of additional information may be maintained such as last successful login date and time, last unsuccessful login date and time, total successful logins, total unsuccessful logins, etc. Now, a method for network device registration in accordance with the invention will be described in more detail.

Figure 7:
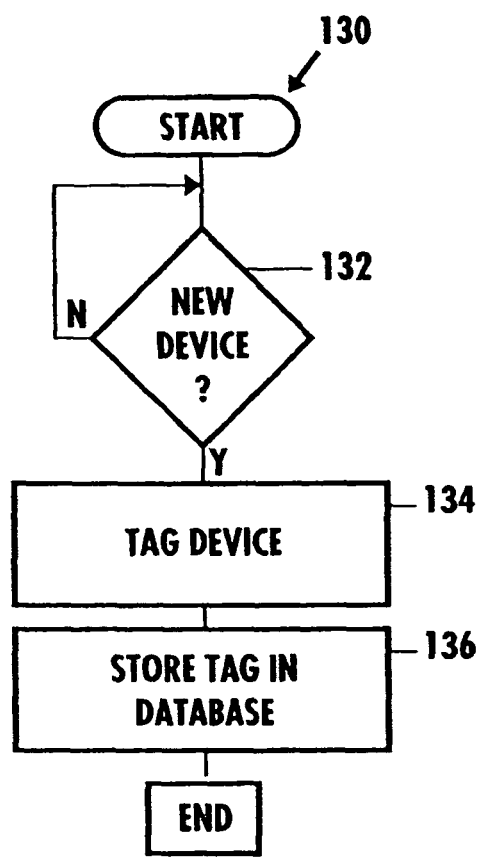
FIG. 7 is a method for tagging a network device in accordance with the invention.

FIG. 7 is a method 130 for tagging a network device (network device registration method) in accordance with the invention. The method achieves the goal of uniquely identifying each network device that connects to the electronic transaction system that the fraud detection and prevention system is guarding. Ideally, this method is performed every time a device connects to a Host protected by this system, and may also be performed at various points and intervals throughout a session. For example, the system can periodically perform the method to periodically check each device connected to the network. Thus, in step 132, the method determines if the network device is new (e.g., if the network device is already registered in the NDRD and already has been assigned a unique identifier). If the network device is new and does not have a unique fingerprint, then, in step 134, the method generates a unique fingerprint (tag) for the network device. The unique fingerprint may be generated by the client program 54 in each network device (in the example shown in FIG. 2) or by other means such as the fraud server 26 generating a fingerprint for each network device based on information received from the network device or any combination. The unique fingerprint is then stored in the database in step 136 and the method is completed so that each unique network device in the system is uniquely identified.

Thus, when a network device attempts to connect to a network for the very first time, the method ensures that the device is registered (and therefore tracked) in at least two separate ways. First, the method requests a unique Network Device Identifier (NDI) from the NDRD 30 through the Host. The method obtrusively stores the encrypted NDI in at least two pieces; for example Part A in the registry and Part B in a file. The NDIs are distributed by NDRD and are guaranteed to be unique. The method also generates a Network Device Fingerprint (NDF) for each device by unobtrusively gathering information about the device, such as hardware serial numbers, software serial numbers, install dates, and other information, and sends the resulting NDF to NDRD through the Host (the network service provider). Although the individual components of an NDF are not guaranteed to be unique, increasing the size of the NDF or number of elements of information used to create the NDF increases the likelihood that the resulting NDF is unique and increases its value for positive identification. In accordance with the invention, the combination of the NDI and the NDF is unique and permits each network device to be uniquely identified. Thus, the NDI shown in FIG. 6 includes the NDF since the combination will uniquely identify a network device.

The exact methodology for registering a device is not critical, provided that it uniquely identifies devices with an extremely high likelihood. For example, various methods for uniquely identifying devices may be slightly different to accommodate unique aspects of thin clients, handheld computers, cell phones, game terminals, and other device types. All of these variations are within the scope of the invention. In a preferred embodiment, the client program 54 may gather information for each network device in order to generate the NDF. It is very likely that hosts utilizing this system may distribute a common registration method in different ways, depending on end-user characteristics and typical platforms used to connect to their network, or even execute the registration method remotely. However, those skilled in the art will also appreciate that any system that uniquely identifies and registers a network device with a centralized NDRD (whether through an intermediate Host or through direct communications) are within the scope of this invention.

In addition to facilitating communication between NDRM and NDRD, the network service provider Host also passes an End-user Account Identifier (EAI) to the NDRD associated with the specific end-user account that is trying to access/connect to the network service provider. This identifier may be a customer account number, or other unique value associated with a specific end-user account that is not used in the Host system for any other purpose. Depending on the business relationship between Host and NDRM service provider, actual customer information may or may not be registered. However, whether or not actual customer information is provided does not substantively change the process. In accordance with the invention, the NDRD tracks every network device (having a unique NDI) that tries to connect to a Host, along with its corresponding NDF. The NDRD also maintains an association for every EAI that connects from every unique network device. The NDRD also tracks information such as first connection, last connection, total connections, last failed connection, total failed connections, NDI status by Host, and NDF status by Host. In accordance with the invention, the system may utilize the NDI, the NDF, the combination of the NDI and NDF or other information in order to validate a user/device. For example, the other information may be a serial number of a cell phone. Now, an example of the preferred database schema of the fraud detection system will be described in more detail.

Figure 8A:
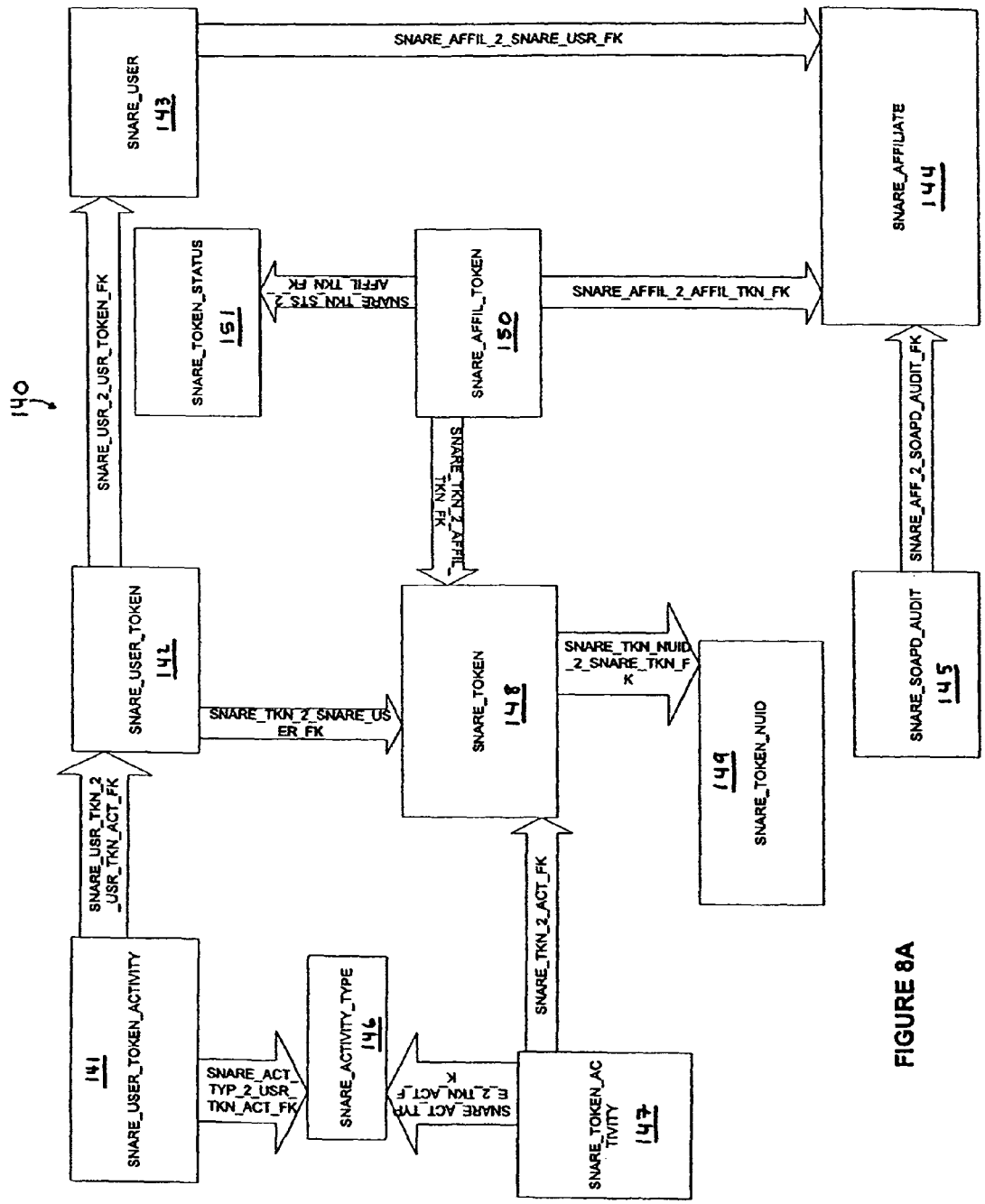
FIG. 8A is a diagram illustrating the relational database tables for an example of a preferred embodiment of a database schema for a fraud detection system in accordance with the invention.

FIG. 8A is a diagram illustrating the relational database tables for an example of a preferred embodiment of a database schema 140 (for the ieSnare product of iovation, inc.) for a fraud detection system in accordance with the invention and FIGS. 8B-8E are diagrams illustrating further details of the database tables shown in FIG. 8A. As shown in FIG. 8A, the database schema 140 may include a plurality of database tables including a SNARE_USER_TOKEN_ACTIVITY table 141, a SNARE_USER_TOKEN table 142, a SNARE_USER table 143, a SNARE_AFFILIATE table 144, a SNARE_SOAPD_AUDIT table 145, a SNARE_ACTIVITY_TYPE table 146, a SNARE_TOKEN_ACTIVITY table 147, a SNARE_TOKEN table 148, a SNARE_TOKEN_NUID table 149, a SNARE_AFFIL_TOKEN table 150 and a SNARE_TOKEN_STATUS table 151 that are linked together by at least a primary key such as SNARE_USR_TKN_2_USR_TKN_ACT_FK as shown. The various primary keys between each table in the database schema are not described here, but appear in FIG. 8A. In these database tables, the TOKEN variable corresponds to the NDI described elsewhere in this document and the NUID variable corresponds to the NDF described elsewhere in this document.

Figure 8B:
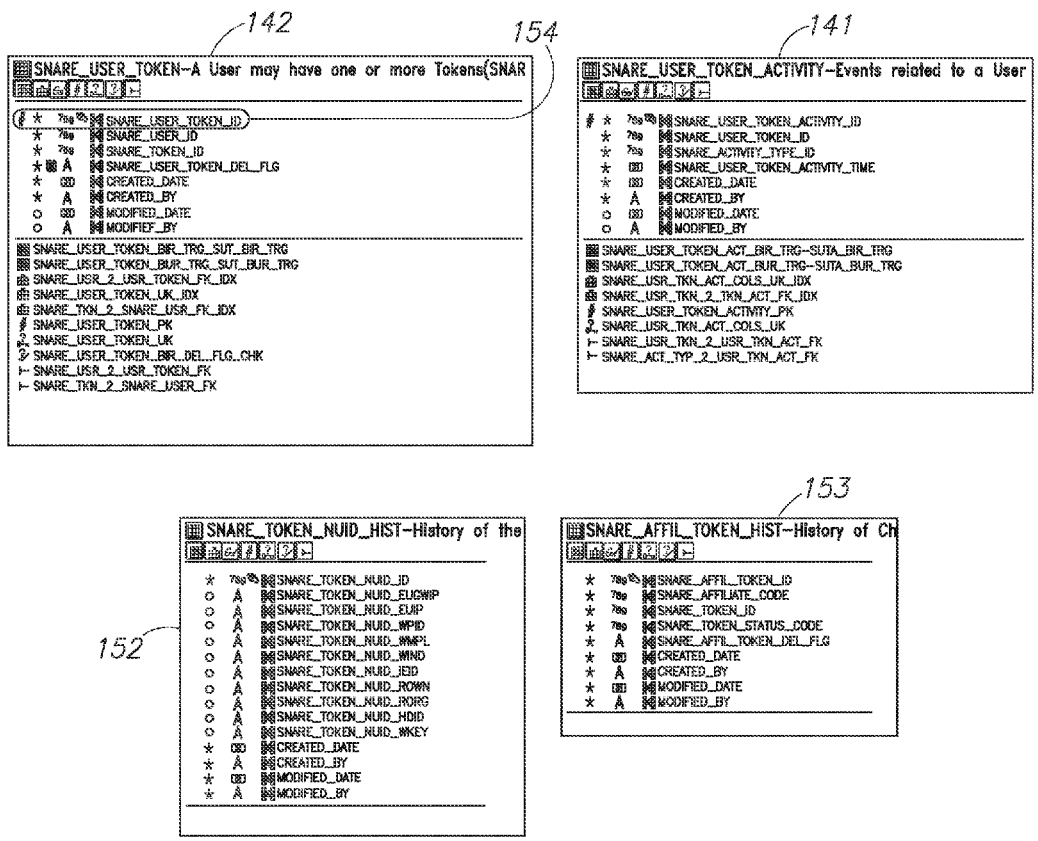
FIGS. 8B-8E are diagrams illustrating further details of the database tables shown in FIG. 8A.
Figure 8C:
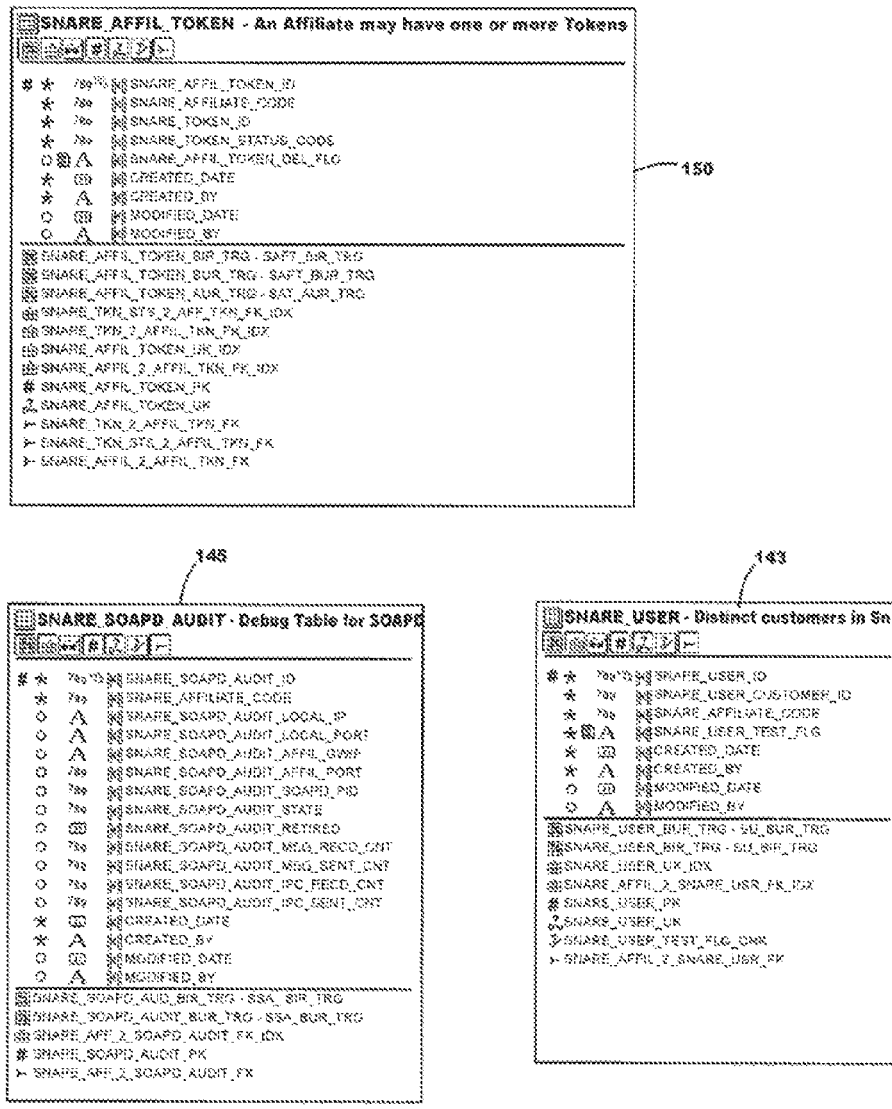
Figure 8D:
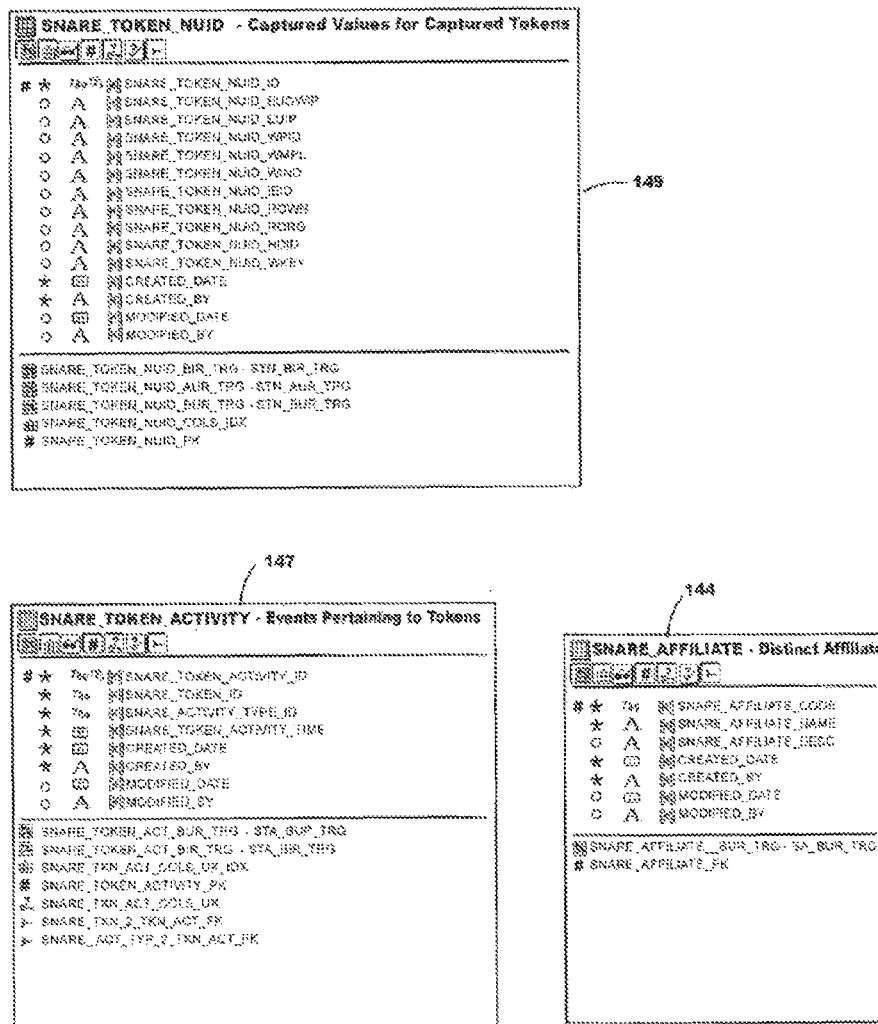
Figure 8E:
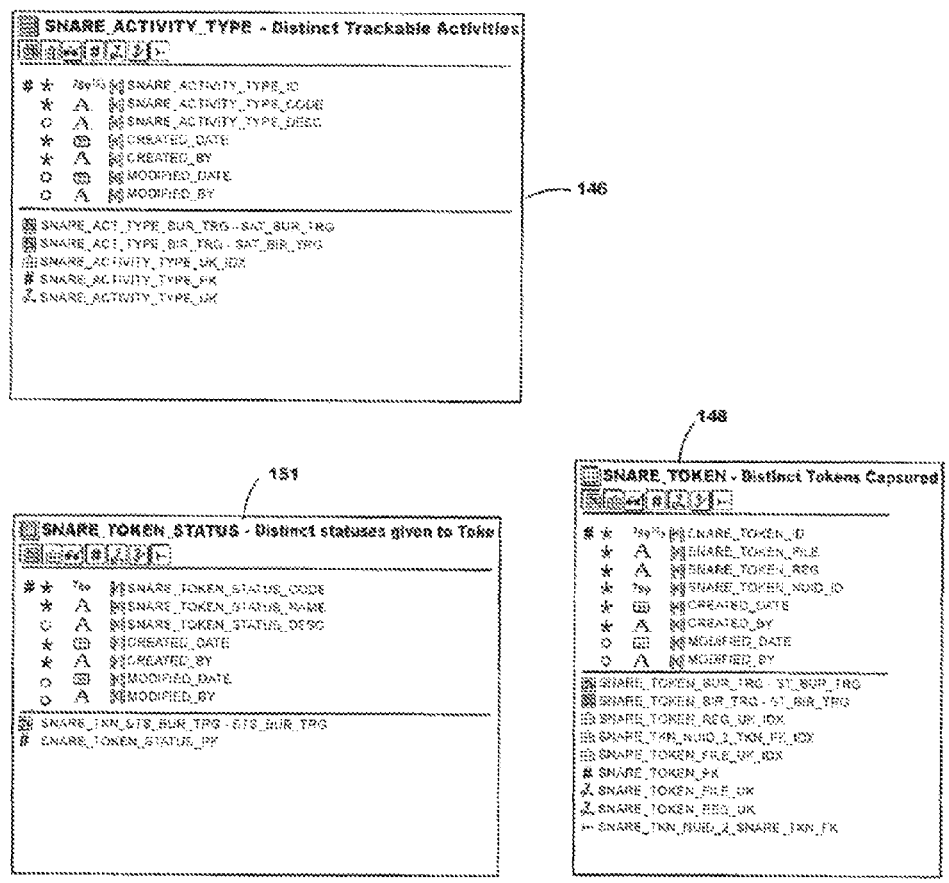

FIG. 8B illustrates more details of the SNARE_USER_TOKEN table 142 and the SNARE_USER_TOKEN_ACTIVITY table 141 along with a SNARE_TOKEN_NUID_HIST table 152 and a SNARE_AFFIL_TOKEN_HIST table 153 that are not shown in FIG. 8A. As shown in FIG. 8B, each data field 154 in each table is shown wherein each data field contains various characteristics, such as the type of data stored in the field, etc . . . . In accordance with the invention, each user of the system may have one or more tokens (identifiers) that are stored in the SNARE_USER_TOKEN table 142 and any events related to a particular token for a particular user are stored in the SNARE_USER_TOKEN_ACTIVITY table 141. The HIST tables 152, 153 contain historical data about the tokens and the affiliate tokens. FIG. 8C illustrates more details of the SNARE_USER table 143 (that contains data about each user of the system), the SNARE_SOAPD_AUDIT table 145 (that contains debug information for the system) and the SNARE_AFFIL_TOKEN table 150 that contains the one or more tokens (identifiers) for each affiliate of the system wherein the affiliate is a particular network service provider. FIG. 8D illustrates more details of the SNARE_AFFILIATE table 144 (that contains data about each affiliate associated with the system), the SNARE_TOKEN_ACTIV- ITY table 147 (that contains data about any events pertaining to a particular token) and the SNARE_TOKEN_NUID table 149 that contains data about the fingerprint for a network device for a device with a particular token/NDI. Finally, FIG. 8E illustrates more details of the SNARE_ACTIVITY_TYPE table 146 (that contains data about each unique/distinct trackable activities occurring in the system), the SNARE_TOKEN table 148 (that contains data about each token stored in the system) and the SNARE_TOKEN_STATUS table 151 that contains unique/distinct statuses for each token in the system.

Figure 9A:
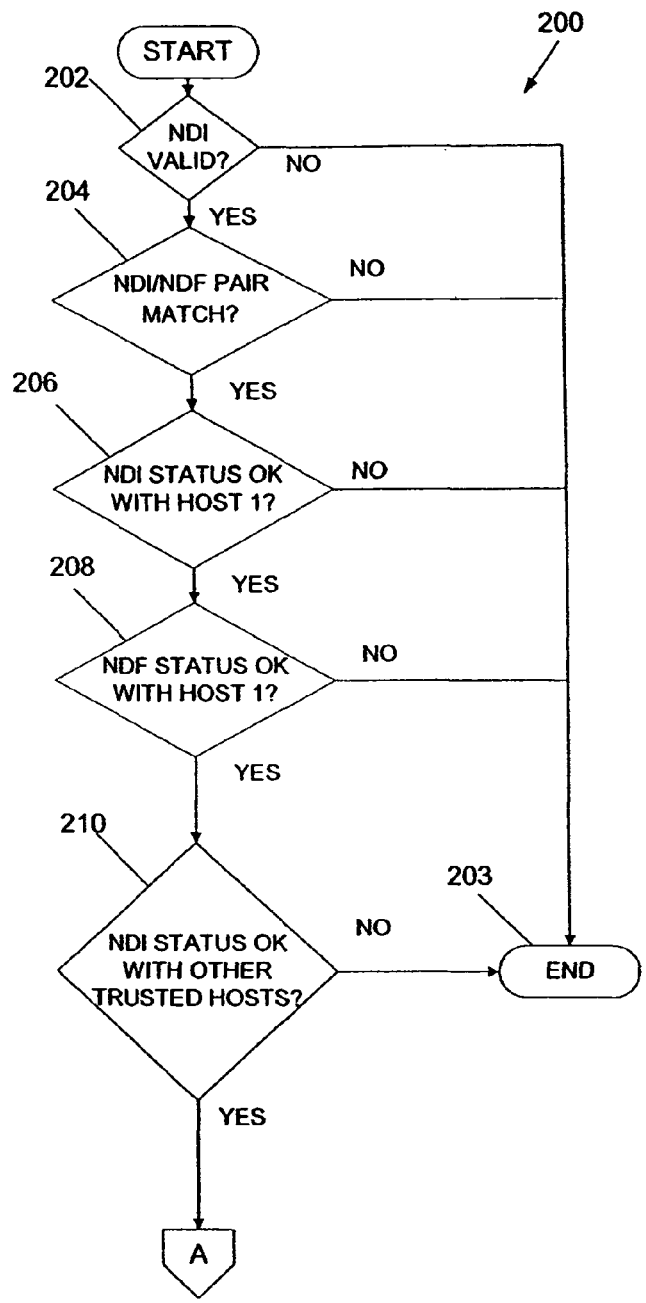
FIGS. 9A and 9B are a flowchart illustrating a preferred method for validating an account using the fraud detection and prevention system in accordance with the invention.
Figure 9B:
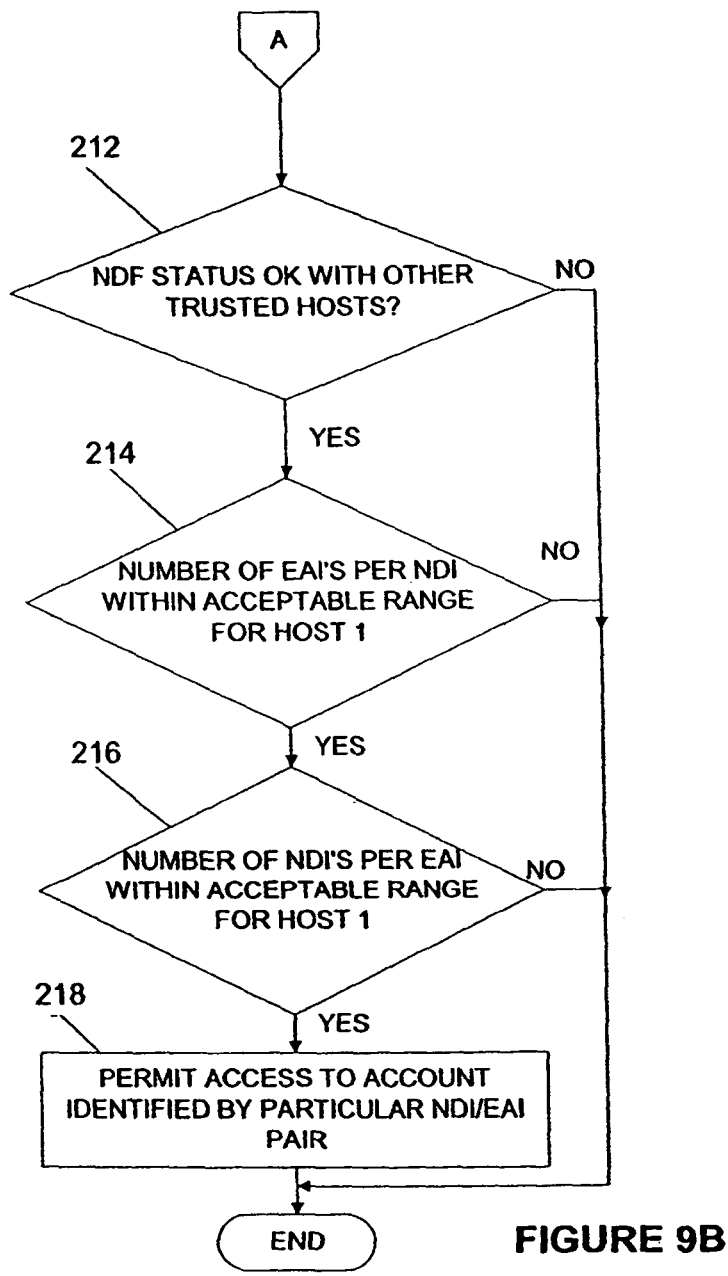

FIGS. 9A and 9B are a flowchart illustrating a preferred method 200 for validating a device and device/account correlation where a Host is using the fraud detection and prevention system in accordance with the invention. FIGS. 9C-9F illustrate methods for validating a new user/device and an existing user/device in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In operation, prior to an account (a particular network device with a particular end user account identifier) being authorized by a particular Host (network server provider), a series of validation steps occur each time. If the particular network device or device/account correlation being tested fails to satisfy any of the validation steps described below, the validation is aborted and the device/account is denied access to the particular Host. The validation steps may be initiated by hosts at any number of customer interaction points, including but not limited to initial connect to network, account set up, login, change to account information, deposit, withdrawal, purchase, randomly throughout connection to network, etc. In more detail, in step 202, it is determined if the network device identifier (NDI) is valid. In more detail, the NDI must appear unaltered, be of a value originally issued by the NDRD, and not appear to be currently logged into the same Host. An invalid NDI will not be allowed to connect to the Host as shown in step 203. If the NDI is valid, then in step 204, it is determined if the NDI/network device fingerprint (NDF) pair match. In particular, the NDF provided at login must match the NDF value originally associated with the NDI of the network device trying to connect to Host. However, some change in the NDF is permitted. For example, 'NDF drift' must be considered as individual elements that are used to calculate an NDF can change over time. Generally, additional elements not present in the original NDF, such as a new piece of software or hardware has been installed, are not worrisome. In these cases, the NDF is updated, and the changes noted. However, changes to existing individual NDF values are more worrisome. In accordance with the invention, each Host may establish rules for system drift and which one or more elements of the NDF they perceive as critical and therefore should not be changed without causing an exception/error message. For example, the serial number of the central processing unit may be considered critical and therefore will generate an error message (a mismatched NDI/NDF pair) while a change in the amount of memory in the network device alone may not cause a mismatched NDI/NDF pair. As another example, several non-critical elements of the network device may be changed, but the NDF/NDI pair will still be considered to be matching. Thus, depending on rules established and maintained by each Host, a NDI/NDF pair may be considered mismatched and not allowed to connect to Host in step 203.

In step 206, if the NDI/NDF pair match, it is determined if the NDI status is acceptable to the particular Host. In particular, an individual network device may connect to several networks protected by this system, and therefore the particular NDI may be associated with multiple hosts. In accordance with the invention, each NDI has a status for each Host using NDRD, and each Host defines any number of statuses for NDIs. When a network device is trying to connect to Host 1, NDRD follows any rules associated with the NDI status for Host 1. For example, Host1 may establish just two status levels, one to allow access and one to deny access. Host2 may establish a single set of several status levels, where each status has a different set of criteria and where each status determines which area of their network a device/account is allowed to access. Host3 may have several sets of statuses, where set1 applies to connecting to the network, set2 applies to accessing various areas of the network, and set3 applies to various activities on the network (such as establish a new account, change account info, purchase, etc.) and where each status has a unique criteria established and maintained by Host3. If the NDI status is not acceptable to the particular Host, the method is aborted in step 203 and access is denied. In step 208, if the NDI status is acceptable to the Host, it is determined if the NDF status for the particular network device is acceptable for the particular Host. In particular, each NDF also has a status for each Host using the NDRD, and each Host defines any number of statuses for the NDFs. When a network device is trying to connect to Host 1, NDRD follows any rules associated with the NDF status for Host 1. As with status levels and associated rules for NDIs, the hosts may establish any number of status levels for NDFs appropriate to their purpose. If the NDF status is not acceptable to the particular Host, the method is aborted in step 203 and access is denied. These two steps (206, 208) are one line of defense against hackers that remove all traces of NDIs and try to connect to a protected network. In extreme cases, a new NDI might be issued to a network device, but access to the network might still be denied depending on the status of the NDF controlled by each Host, both manually and in rules established with NDRD.

In step 210, if the NDF status for the network device is acceptable to the particular Host, it is determined if the NDI status for the particular network device is acceptable for any other Host identified by the particular Host as being trusted. In particular, individual network devices may connect to several networks protected by this system and therefore the NDI may be associated with multiple hosts. Upon trying to connect to Host 1, the NDI status for Host 1 may be clear, while the NDI status for other hosts is marked as 'bad'. In accordance with the invention, each Host can identify other hosts that are 'trusted', whereby if the NDI status is 'bad' for any other trusted Host, network access would be denied independent of the NDI status for Host 1. This step prevents fraud by a user that might have a bad status on a first network service provider but not on a second network service provider and thus shares information about a "bad" network device that is identified by a particular NDI. If the NDI status is not acceptable to any trusted hosts, the method is aborted in step 203 and access is denied.

In step 212, if the NDI is acceptable to all trusted hosts, it is determined if the NDF status is acceptable to any other hosts that are indicated as "trusted" by the particular Host. In particular, individual network devices may connect to several networks protected by this system, and therefore a particular NDF may be associated with multiple hosts. Upon trying to connect to Host 1, the NDF status for Host 1 may be clear, while the NDF status for other hosts is marked as 'bad'. Each Host can identify other hosts that are 'trusted', whereby if the NDF status is 'bad' for any other trusted Host, network access would be denied independent of the NDI status for Host 1. This step shares information about the NDF statuses of network devices across the electronic transaction system. If the NDF of the particular network device is not acceptable to a trusted Host, the account with the NDF is denied access. In step 214, if the NDF is acceptable to all of the trusted hosts, then it is determined if the number of end user account identifiers (EAIs) per NDI is within the acceptable range for the particular Host. In particular, each Host establishes rules for the number of EAIs allowed per NDI, or in other words the number of users that can use an individual network device. For example, Host 1 may not be worried about 3 or fewer accounts coming from an individual PC, may want to be warned about 4-6 accounts coming from a PC, and may want to deny network access to any login attempt where 7 or more accounts are coming from the same PC. For each set of rules, different levels of concern and different remedies (no action, warning or denial of access) may be put into place and the particular levels of concern and remedies may be adjusted by each Host in accordance with the invention. As another example, another Host may allow only one account per network device and deny access to any login attempt where more than one account has tried to connect from the same network device.

In step 216, it is determined if the number of NDIs per each EAI is within the acceptable range for the particular Host. In particular, each Host also establishes rules for the number of NDIs from which each EAI is allowed to connect, or in other words the number of different network devices from which an individual account is allowed to connect. For example, Host1 may not be worried about an account coming from 5 or fewer PCs, may want to be warned about an account using 6-10 PCs, and may want to deny network access to any login that has attempted to connect from 11 or more PCs. Another Host may allow only one account per PC, and deny access to any login attempt coming from a second network device. Thus, these levels of concern remedies are adjustable by each Host in accordance with the invention. In step 218, the account identified by the particular NDI and EAI pair (which has met all of the tests set forth above) is permitted access to the system of the particular network service provider and the data about the transaction/connection is entered into the NDRD.

Figure 9C:
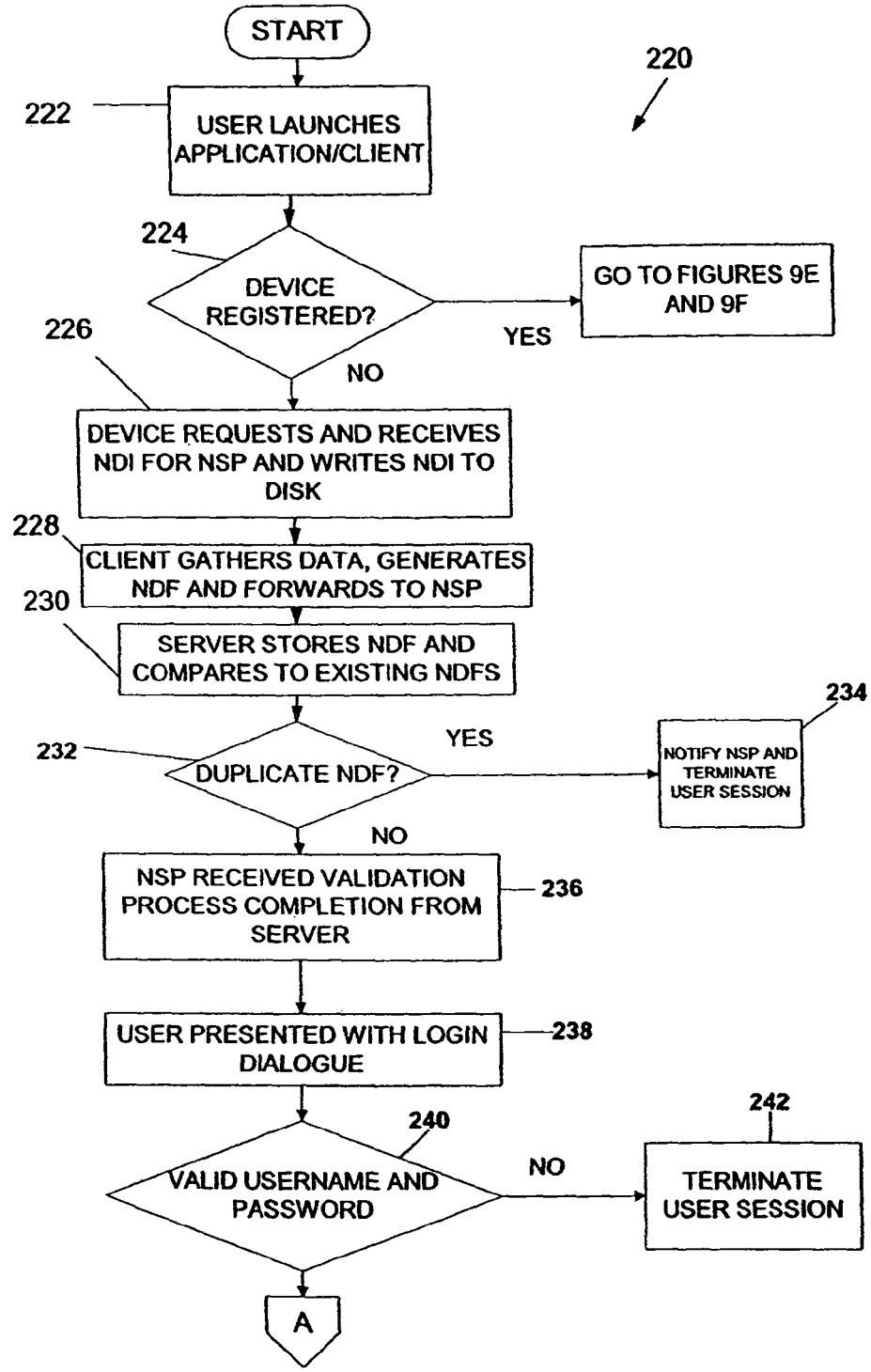
FIGS. 9C and 9D are a flowchart illustrating a preferred method for validating a new user/device using the fraud detection and prevention system in accordance with the invention.
Figure 9D:
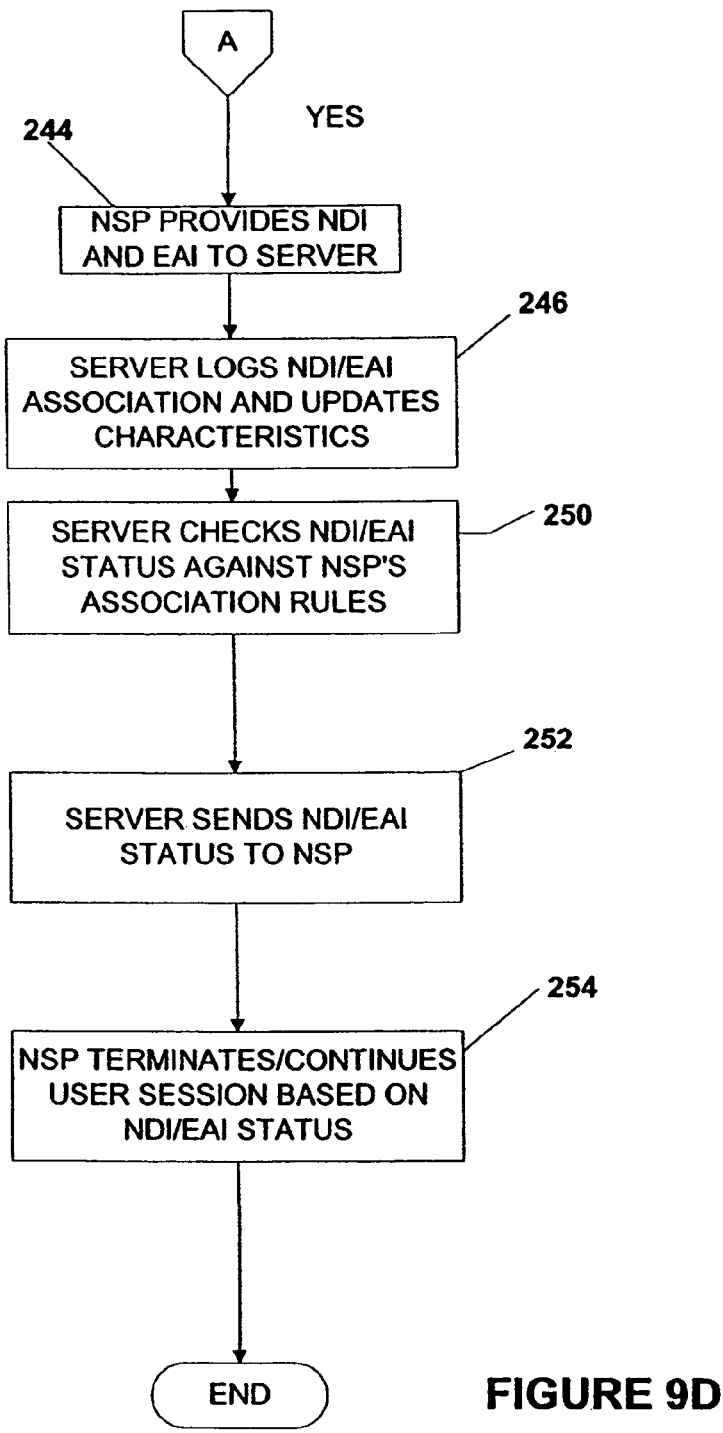

FIGS. 9C and 9D are a flowchart illustrating a preferred method 220 for validating a new user/device using the fraud detection and prevention system in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In step 222, a user launches an application (after downloading the application from the network service provider in the embodiment in which the client is embedded in an application) and the application automatically launches the client. In step 224, the client determines if the device is registered with the fraud detection system. If the device is already registered, then the method is completed and method for validation an existing user is set forth in FIGS. 9E and 9F. If the client does not detect that the device is already registered, then in step 226, the client requests a new NDI (identifier/token/serial number) from the network service provider who forwards on the request to the fraud server 26. The server generates a unique NDI and passes it onto the network service provider that then forwards the NDI onto the client. The client then stores the NDI onto its disk and into its registry. In step 228, the client gathers data from the device, generates an NDF and forwards that NDF onto the network service provider. In step 230, the network service provider forwards the NDF onto the server that stores the NDF and checks the NDF against existing NDF data for the status of the particular NDF.

In step 232, the server determines if the NDF is a duplicate such as if a hacker has deleted the previous NDI on the device, but the NDF was identical to an existing NDF. If there is a duplicate NDF, then the network service provider is notified in step 234 and the user session is terminated. In step 236, if the NDF is not duplicate (indicating a new device), the server returns a validation process acknowledgment message to the network server provider. In step 238, the user is presented with a login dialog by the network service provider. In step 240, the network service provider determines if a valid username and password are provided. If an invalid username or password is provided, the user session is terminated in step 242. In step 244, if a valid username and password are provided, the network service provider sends the NDI of the device and end-user account information (EAI) generated by the network service provider to the server. In step 246, the server logs the NDI and EAI association into its database and updates various information for the device such as the last successful login date/time, total logins and other data about the device. In step 250, the server checks the NDI and EAI status against the parameters of the network service provider. In step 252, based on the network service provider rules, the server sends the NDI/EAI status to the network service provider. In step 254, the network service provider terminates/continues the user session based on the NDI/EAI status returned from the server. Now, a method for validating an existing user/device will be described in more detail.

Figure 9E:
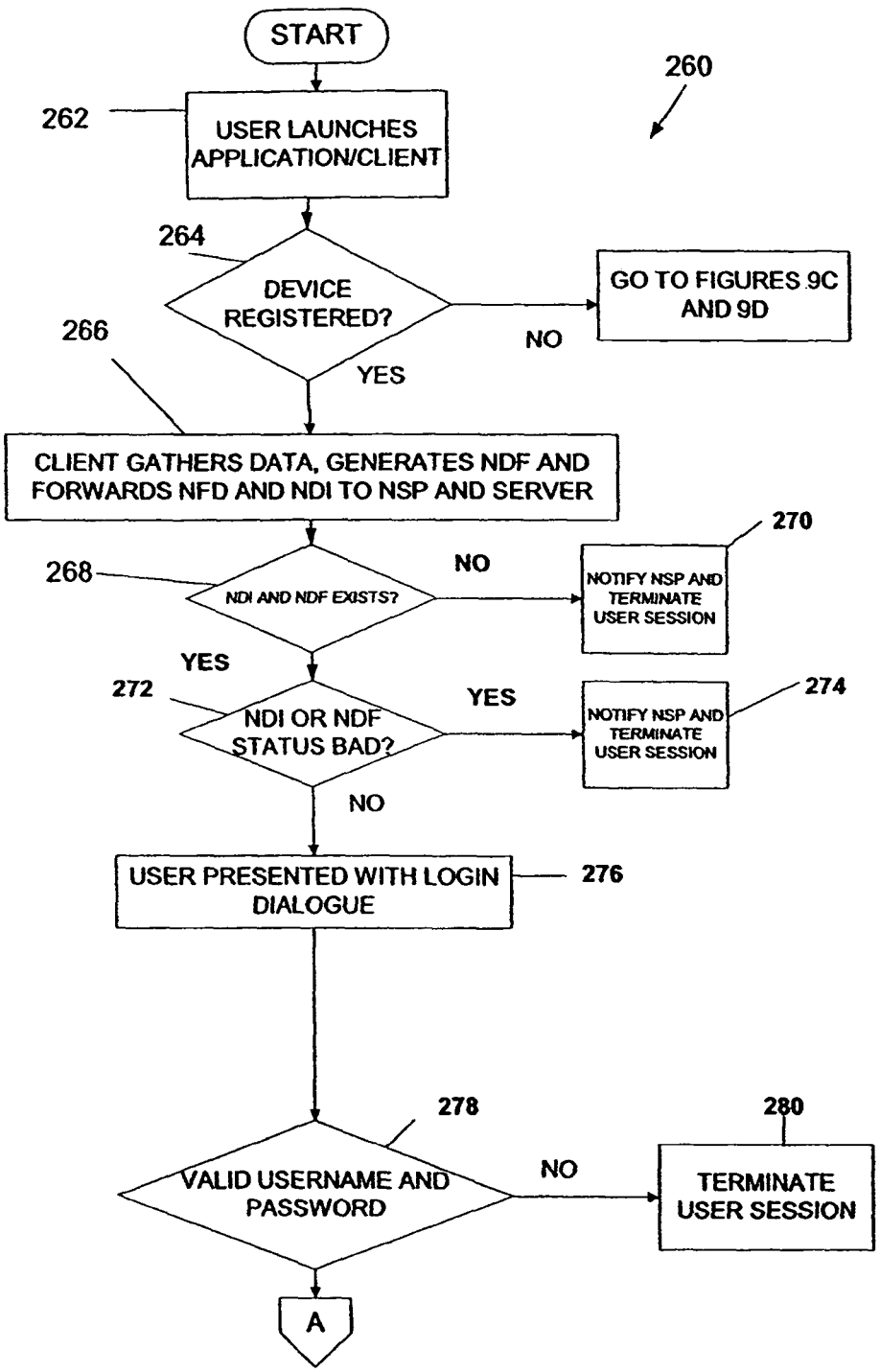
FIGS. 9E and 9F are a flowchart illustrating a preferred method for validating an existing user/device using the fraud detection and prevention system in accordance with the invention.
Figure 9F:
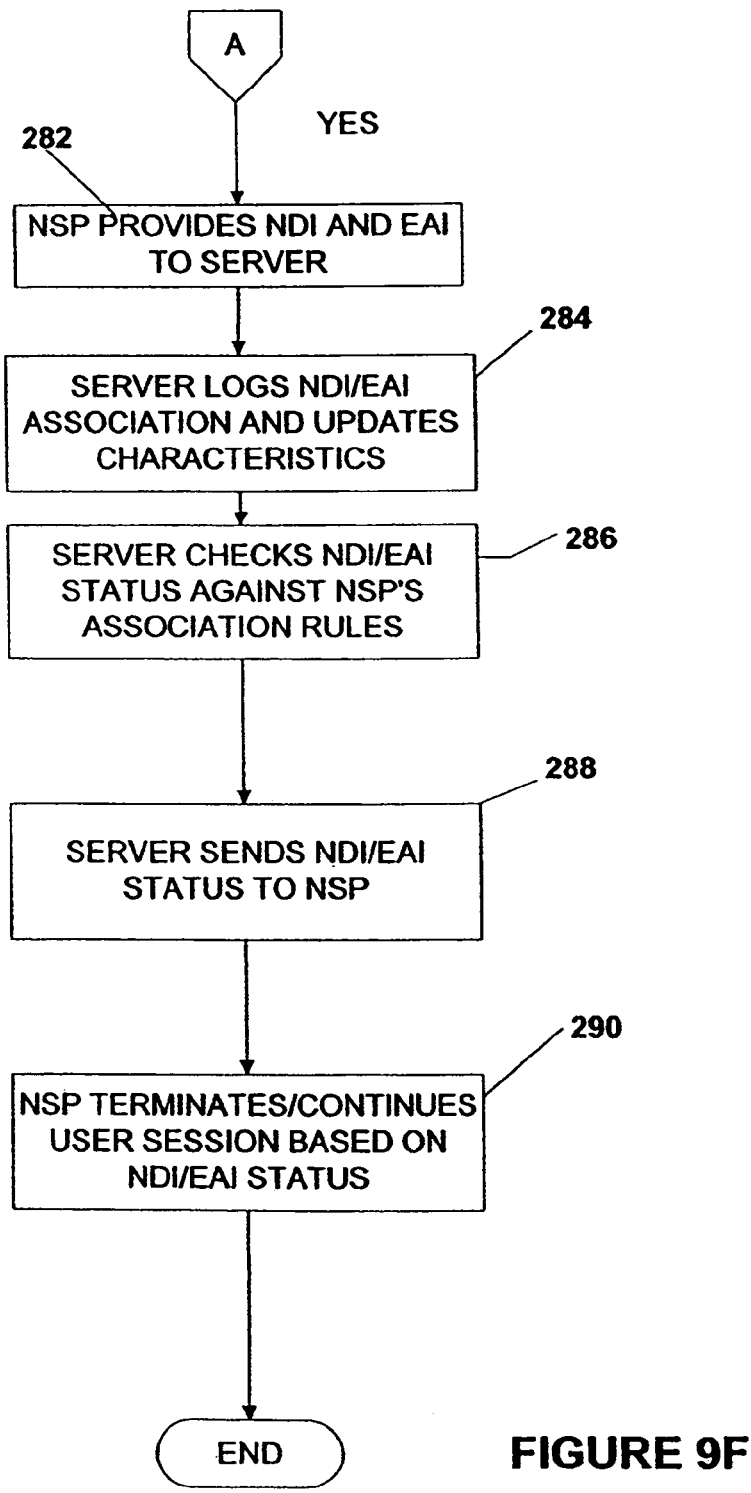
Figure 10:
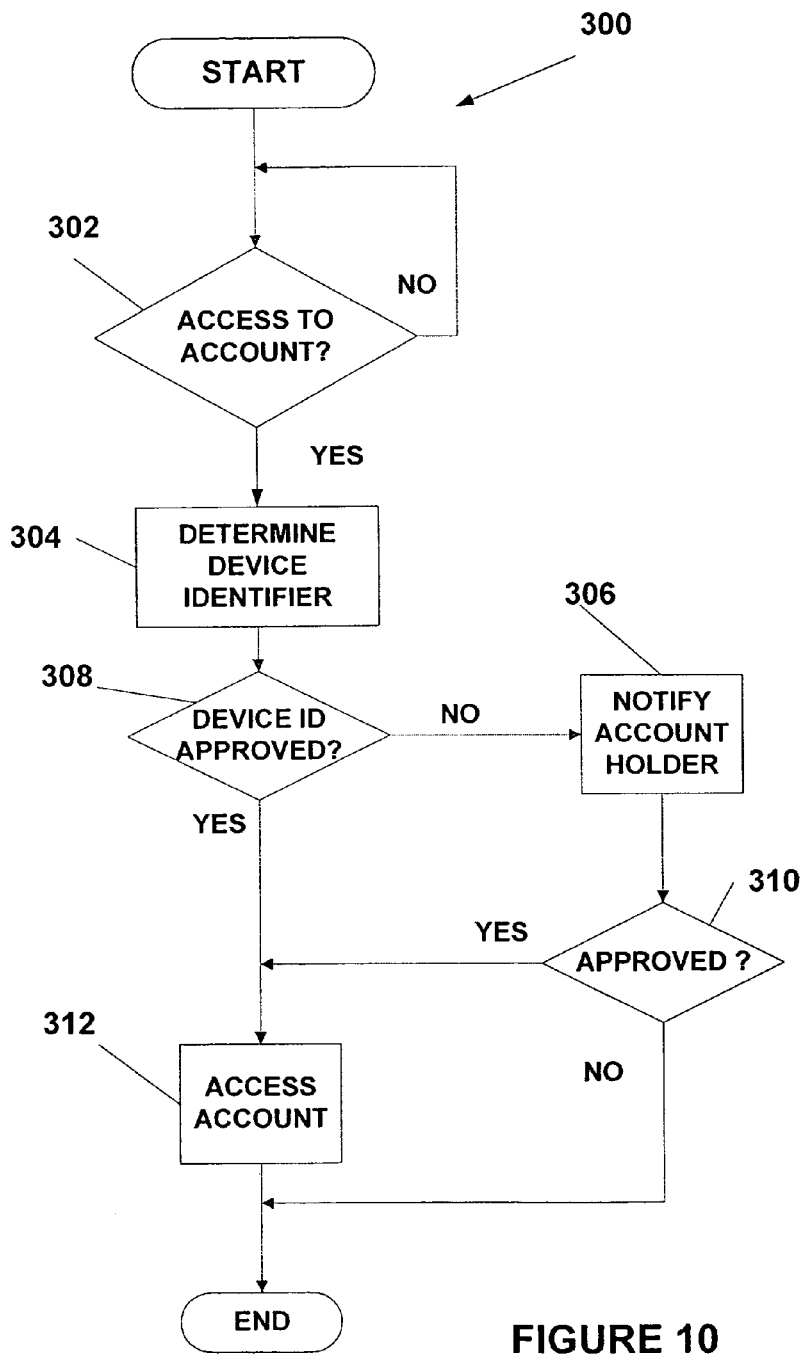
FIG. 10 illustrates a method for account access authorization in accordance with the invention.

FIGS. 9E and 9F are a flowchart illustrating a preferred method 260 for validating an existing user/device using the fraud detection and prevention system in accordance with the invention. The steps described below may be implemented by computer instructions in a software module being executed by a particular Host computer of a network service provider or by computer instructions in a software module being executed by the fraud server. The invention is not limited to any particular location of the computer instructions that implement the validating method. In step 262, a user launches an application (after downloading the application from the network service provider in the embodiment in which the client is embedded in an application) and the application automatically launches the client. In step 264, the client determines if the device is registered with the fraud detection system. If the device is not already registered, then the method is completed and method for validation a new device is set forth in FIGS. 9C and 9D. If the device is already registered, then in step 266, the client gathers data from the device, generates an NDF and forwards that NDF and the already assigned NDI onto the network service provider. The network service provider then forwards the NDF and NDI onto the server that stores the NDF and checks the NDF against existing NDF data for status of the particular NDF.

In step 268, the server determines if the NDF and the NDI pair exists in the database. If there is not a match in the database, then the network service provider is notified in step 270 and the user session is terminated. In step 272, the server determines if the NDI or NDF status is bad and, if the status of either is bad, the network service provider is notified and the user session is terminated in step 274. If the NDI and NDF statuses are good, then in step 276, the user is presented with a login dialog by the network service provider. In accordance with the invention, the client and/or the validation system may also present the login to the user and perform the user login process in addition to the validation processes. In step 278, the network service provider determines if a valid username and password are provided. If an invalid username or password is provided, the user session is terminated in step 280. In step 282, if a valid username and password are provided, the network service provider sends the NDI of the device and EAI to the server. In step 284, the server logs the NDI and EAI association into its database and updates various information for the device such as the last successful login date/time, total logins and other data about the device. In step 286, the server checks the NDI and EAI status against the parameters of the network service provider. In step 288, based on the network service provider rules, the server sends the NDI/EAI status to the network service provider. In step 290, the network service provider terminates/continues the user session based on the NDI/EAI status returned from the server.

Several examples of the operation of the above method will now be provided. As described above, each Host will establish its own customized rules for every aspect of the present validation method. Because of this, the same circumstances that result in denied access for an end-user on one Host may not result in denied access on another Host. Thus, the following examples are simply intended to illustrate some of the ways in which the present invention might be utilized.

Host1 identifies a problem with an account identified by an EAI of EAI2004. After closing the account within Host1's system, a Host1 administrator logs into the NDRD and searches the NDRD using a user interface to identify four additional NDIs used by EAI2004, and changes the status of each NDI such that they will never be allowed to connect to Host1. In addition, the administrator identifies 2 other EAIs that have used these NDI's to connect to Host1. After researching the newly identified accounts, they are determined to be potentially fraudulent and also closed. Thus, the user is able to identify an account, its associated network devices and other EAIs associated with the identified network devices that will be denied access to the system. In a first example, an end-user attempts to connect to Host1 from a NDI that has been identified by Host1 as having been used in a fraudulent transaction. Based on the status set by Host1, the user is denied access to the network. In a second example, an end-user attempts to connect to Host1 from a NDI that has been identified by Host1 as having been used in a suspicious manner. Based on the status set by Host1, the user is allowed access to the network, but for every valid login and password combination provided by the end-user, that account is automatically disabled on Host1's system, and the user is prompted for a different user name and password.

In a third example, an end-user attempts to connect to Host1 from a NDI that has been identified by Host2 as having been used in a fraudulent transaction. Based on the NDI status set by Host2, and the fact that Host1 has identified Host2 as trusted, the user is denied access to the network. In addition, the NDI status for Host1 is changed to 'bad' and the end-user's account is closed on Host1's system. In a fourth example, an end-user attempts to connect to Host1 from a NDI that has been identified by Host3 as having been used in a fraudulent transaction. Because Host3 has not been identified as trusted by Host1, this condition is ignored and the user is allowed access to the network.

In another example, periodically, an administrator from Host1 receives a report from the NDRD of all NDI's identified by trusted hosts as 'bad' that have a status for Host1 of 'good', including all the EAI's for Host1 associated with these NDIs. The administrator researches these accounts to determine the appropriate course of action. The administrator may then, for example, change the status of the NDIs and EAIs to "bad", and research associated user accounts within their system to identify potential fraudulent accounts.

In another example, Host1 proactively screens account information for all accounts identified through the NDRD as sharing the same NDI, and suspicious accounts are identified for further investigation. For example, three accounts with stated addresses in three different countries that have logged in from the same network device would be identified as suspicious. Alternatively, the fraud preventing system may automatically and periodically generate information from the NDRD based on the particular Host's requests. Now, an example of the operation of an implementation of the fraud detection system in accordance with the invention will be provided.

Once a particular network service provider (NSP1) has integrated the fraud detection client and system into its system, the network service provider system may automatically request information. etc. from the fraud detection system. The request of information may occur for various reasons, such as a new customer installation, a customer login, a customer purchase/deposit attempt, and a customer refund/withdrawal attempt. In each situation, the network service provider's client software may invoke the fraud detection client that may return a set of information that the client software to pass onto a backend system. In an implementation of the system, the backend system of the network service provider may pass 1) a unique identifier (which will be provided to the network service provider that signs up for the service) that uniquely identifies the particular network service provider to the fraud detection system and permits the NDRD to store data according to the particular network service provider; 2) a unique "session identifier" to identify the particular user access session to the particular network service provider; 3) a unique customer identifier for the specific customer (if available, which it should be in all cases except new customer installation), such as the EAI; 4) an "action code" identifying the type of user account (see below); and 5) the information that the client provided via the API to the Server. The server may then respond via the API with an "action response" indicating a suggested course of action for the particular account, information that it wishes to pass through to the client, such as the ieSnare Client in a preferred embodiment of the invention, or both. Now, an example of the format of the API for the fraud detection system will be described in more detail.

In a preferred embodiment, the API uses extensible markup language ("XML") to pass information between the backend system of the network service provider and the fraud detection server. The API is a simple but powerful way to automate common queries and interpret their responses.

The API requests are typically formatted as follows:

```
<ieRequest>
<SnareID>SnareCustomerNumber</SnareID>
<SessionID>Session Number</SessionID>
<CustomerID>Your Unique Customer Identifier
(if not available, leave blank)</CustomerID>
<Action>Action Code Number</Action>
<Data>Information ieSnare Client provided</Data>
</ieRequest>
```

The API responses will typically be formatted as follows:

```
<ieResponse>
<SnareID>SnareCustomerNunber</SnareID>
<SessionID>Session Number</SessionID>
<CustomerID>Your Unique Customer Identifier
(or blank if n/a)</CustomerID>
<ComputerID>Your Unique Computer Identifier</ComputerID>
<Response>Response Code Number</Response>
<Reason>Reason Code Number</Reason>
<PassData>Information to pass to the ieSnare Client
(optional)</PassData>
</ieResponse>
``` wherein the currently supported Action Code Numbers are:
1000—new account creation
2000—login attempt
3000—purchase/deposit attempt
4000—refund/withdrawal attempt
and the currently supported Response Code Numbers are:
0—ACCEPT
1—TRAP
2—REJECT
and the currently supported Reason Code Numbers are:
0—standard rules
1—manually set to always for this user/computer
2—association with other user/computer
3—number of other users sharing computer
4—number of computers this user is using In an alternative embodiment, the fraud detection system may also use multi-factor reputations. In particular, the embodiment described above maintained the reputation of a network device. In this alternate embodiment, the reputation of a network device or user account may be maintained using one or more reputation factors. The reputation factors that may be used to establish the reputation of the user/account may include but are not limited to a credit card account number of the user, a fingerprint of the user, an email address of the user, a phone number of the user, a physical address of the user, a cellular phone number of the user or any other information that contains evidence of the reputation of the user that may be transferred to the user account reputation. In accordance with the invention, each reputation factor is filtered through a set of rules to determine if the reputation factor is applied to/attributed to/affects the reputation of the account. In accordance with the invention, each service provider may have its own filtering mechanism with a unique set of filtering rules for the reputation factors. The filtering rules may be time sensitive, date sensitive, trust sensitive (the reputation factor might be ignored if it is from an untrusted source), relevancy, etc . . . . An example of a time or date sensitive filtering rule might be that a piece of evidence about a bad reputation, such as late payment on a credit card, might be filtered out (and not affect the reputation of the account) if it is more than 1 year old. An example of relevancy rule might be that a provider of on-line gaming might decide to ignore and not apply evidence of a user returning more than a normal number of products to stores using the credit card as that evidence does not, alone, concern that particular provider. Once the reputation factors have been filtered by the provider, they are combined together to determine the effect on the reputation of the account. In accordance with the invention, the reputation factors are unique to a particular user (such as a credit card number) and are relevant to each account that the user has with different service providers. Thus, in accordance with the invention, the multiple different reputation factors may be cross-correlated to generate a reputation of the user/account that may, as above, be shared across a network.

To illustrate the use of a multiple factor reputation in accordance with the invention, the following simple example is provided. In this example, a new customer (C1) logs onto eBay with a new network device (D1) such as a laptop computer of the new customer (C1). The fraud detection system will generate a unique identifier for the network device D1. The new customer uses a Visa account to establish the eBay account. Thus, the new customer has a reputation that is inferred from the eBay account, the device identifier and the Visa account assuming that eBay does not filter out the reputation evidence of the network device and Visa account. In this example, a provider that is part of the network identifies that the Visa account has not paid its bills while another provider indicates that the same Visa account returns a lot of goods purchased with the credit card. This information about the Visa account is shared with the other providers that are part of the network and affect the overall reputation of the new customer C1. In accordance with the invention, the reputation of the account/customer is maintained by the service provider while the reputation factors are managed by the fraud system of which the service provider is a customer.

FIG. 10 illustrates a method 300 for account access authorization in accordance with the invention. In accordance with the invention, the benefit of the reputation authority shown above may be extended to an end user. As described above, each network device may have a device identifier that uniquely identifies a particular device. For example, a user's laptop computer may have a first unique identifier while the user's desktop computer may have a second unique identifier. Obviously, the computer of a second user would have an identifier that is unique to itself as well. The fraud detection system in accordance with the invention may thus be extended to management end user account access management method 300 shown in FIG. 10. The method shown in FIG. 10 may be implemented with a service provider that includes a fraud detection system having a user account module that is implemented in software in a preferred embodiment of the invention. The user account module may store a list of approved network devices for each user account in the database, compare an identifier of the network device to the approved list and implement the method steps described below. The list of approved network devices may be user configurable, but may also be set by the administrator of the service provider. For example, the user may specify that only the network devices known to him personally may access the account. Alternatively, the administrator may automatically limit the total number of network devices to three.

In step 302, the system may determine if access to a particular account is requested by a user using a particular network device. As with the embodiments above, the account access may be to a third party web site or service wherein the third party is a customer of the fraud detection system in accordance with the invention. Thus, in step 304, the third party determines the unique identifier of the network device (which may be stored in the fraud detection system database or generated when the network device attempts to login to the third party's service/website) and provides the unique identifier to the fraud detection system. To prevent fraud with respect to access to the end user account of the third party, the third party may store information about one or more network devices (each having a unique identifier) that are approved to access the particular end user account. Alternatively, the information about the network devices, the list of approved network devices and the reputation factors (see multiple reputation factor embodiment above) may be stored by the reputation authority, such as ioVation, inc., which then provides the reputation information to the service provider. Thus, in step 308, the third party may compare the identifier of the network device currently trying to access the account against the list of approved devices. If the particular network device is not on the approved list, then in step 306, the system may notify the end user/account holder of the access by the new network device. In step 310, the end user/account holder may approve the new network device or deny access to the new network device so that the end user/account holder may add new network device(s) to his/her approved list, such as when the end user accesses his account from his work laptop computer which she/he has not previously user to access the account. The end user may temporarily approve the network device for a limited time period or alternatively may add the network device to the approved network device list. In accordance with the invention, the particular method of adding network devices to the approved list and how to handle unapproved devices is user or administrator configurable so that a first user may not permit access to any unapproved network devices while a second user may allow unapproved network devices to access the account as long as the user is notified.

If the new network device is approved by the end user or the network device is already on the approved list, then in step 312, access to the account of the end user is permitted. If the new network device is not on the approved list and is not later approved by the end user, the new network device is denied access to the end user account. Thus, even if a thief/hacker has stolen your username and password for a particular account, the thief/hacker will be unable to access the account since the hacker does not also has a network device which is part of the approved list. Thus, the fraud protection system offers another level of security to the end user/account holder in addition to the typical username and password security. Thus, a third party that is a customer of the fraud detection system is able to offer its end users more account security due to the fraud detection system.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer implemented method for use with a system comprising a plurality of network service providers each configured to provide a service, and a network device configured to connect to at least one of the plurality of network service providers over a communications network and when so connected, to use the service or services provided by the at least one of the plurality of network service providers, the method comprising:
   gathering, by at least one hardware processor, information about the network device used to obtain a device identifier that identifies the network device;
   associating the device identifier with one or more reputation factors;
   generating a reputation for the network device based on an evaluation of the one or more reputation factors associated with the device identifier; and
   sharing the reputation with the plurality of network service providers for use thereby to detect fraud associated with use of the network device across the plurality of network service providers.

2. The method of claim 1, further comprising:
   generating a network device identifier for the network device that uniquely identifies the network device in combination with the device identifier.

3. The method of claim 1, further comprising:
   validating the network device on a periodic basis or a random basis.

4. The method of claim 1, further comprising:
   validating the network device upon connection of the network device to one of the plurality of network service providers.

5. The method of claim 1, further comprising:
   validating the network device when the network device logs onto one of the plurality of network service providers.

6. The method of claim 1, further comprising:
   validating the network device when the network device performs a transaction with one of the plurality of network service providers.

7. The method of claim 1, further comprising:
   validating the network device each time that the network device re-connects to one of the plurality of network service providers.

8. The method of claim 1, wherein the reputation factors further comprise one or more of end-user account information provided by one of the plurality of network service providers, a credit card account number of a user, a fingerprint of the user, an email address of the user, a phone number of the user, a physical address of the user, and a cellular phone number of the user.

9. A network security and fraud detection and prevention system for use with a plurality of network service providers configured to provide services, and a network device configured to connect to the network service providers over a communications network, the system comprising:
   one or more storage devices; and
   one or more processors connected to the one or more storage devices, the one or more storage devices storing instructions executable by the one or more processors that when executed thereby implement a method comprising:
   obtaining a device identifier that uniquely identifies the network device;
   associating the device identifier with one or more reputation factors;
   generating a reputation for the network device based on an evaluation of the one or more reputation factors; and;
   sharing the reputation with the plurality of network service providers for use thereby to detect fraudulent use of the network device.

10. The system of claim 9, wherein the method further comprises storing a plurality of records on the one or more storage devices, each record further comprising:
   a host field containing an identifier of a particular one of the plurality of network service providers,
   a user account information field containing information from the particular network service provider that identifies a particular user, and
   the device identifier that uniquely identifies the network device.

11. The system of claim 9, wherein the method further comprises:
   generating a network device identifier for the network device that uniquely identifies the network device in combination with the device identifier; and
   transmitting the network device identifier to the network device.

12. The system of claim 11, wherein the device identifier further comprises a fingerprint.

13. The system of claim 9, wherein the method further comprises validating the network device on a periodic basis or a random basis.

14. The system of claim 9, wherein the method further comprises validating the network device upon connection of the network device to one of the plurality of network service providers.

15. The system of claim 9, wherein the method further comprises validating the network device when the network device logs onto one of the plurality of network service providers.

16. The system of claim 9, wherein the method further comprises validating the network device when the network device performs a transaction with one of the plurality of network service providers.

17. The system of claim 9, wherein the method further comprises validating the network device each time that the network device re-connects to one of the plurality of network service providers.

18. The system of claim 9, wherein the device identifier further comprises a fingerprint.

19. The system of claim 9, wherein the device identifier further comprises a serial number for a cellular phone.

20. The system of claim 9, wherein the network device further comprises one of a cellular phone, a personal digital assistant, a laptop computer, a personal computer and a telephone.

21. The system of claim 9, wherein the one or more reputation factors further comprise one or more of end-user account information provided by one of the plurality of network service providers, a credit card account number of a user, a fingerprint of the user, an email address of the user, a phone number of the user, a physical address of the user, and a cellular phone number of the user.

22. The method of claim 1, wherein the evaluation of the one or more reputation factors associated with the device identifier further comprises:
cross-correlating the one or more reputation factors to generate the reputation.

23. The method of claim 1, wherein the evaluation of the one or more reputation factors associated with the device identifier further comprises:
selecting a portion of the one or more reputation factors associated with the device identifier; and
evaluation only the selected portion of the one or more reputation factors.

24. The method of claim 1, further comprising:
receiving information related to at least a portion of the one or more reputation factors from one or more of the plurality of network service providers, wherein generating the reputation for the network device based on the evaluation of the one or more reputation factors associated with the device identifier further comprises evaluating the information received.

25. The method of claim 1, further comprising:
receiving the one or more reputation factors from a first one of the plurality of network service providers; and
receiving information related to at least a portion of the one or more reputation factors from one or more of the plurality of network service providers other than the first network service provider, wherein generating the reputation for the network device based on the evaluation of the one or more reputation factors associated with the device identifier further comprises evaluating the information received.

26. The method of claim 1, further comprising:
receiving the one or more reputation factors from at least one of the plurality of network service providers.

27. A computer implemented method comprising:
obtaining a device identifier that identifies a network device;
receiving one or more reputation factors from a first one of a plurality of network service providers, the one or more reputation factors being associated with a user or a user account;
associating the device identifier with the one or more reputation factors;
receiving information from a second one of the plurality of network service providers related to at least a portion of the one or more reputation factors;
sharing the information received and the one or more reputation factors with the plurality of network service providers; and
at one or more of the plurality of network service providers, generating a reputation for the network device based on an evaluation of the information related to the portion of the one or more reputation factors associated with the device identifier, and using the reputation to detect fraud associated with use of the network device across the plurality of network service providers.

28. The method of claim 27, wherein the reputation is generated and used by one of the plurality of network service providers other than the first network service provider.

29. A system comprising a plurality of network service providers for use with a network device configured to connect to each of the plurality of network service providers over a communications network, at least one of the plurality of network service providers comprising:
one or more storage devices; and
one or more processors connected to the one or more storage devices, the one or more storage devices storing instructions executable by the one or more processors that when executed thereby implement a method comprising:
associating a device identifier with the network device;
obtaining one or more reputation factors associated with the device identifier from others of the plurality of network service providers;
generating a reputation for the network device based on the evaluation of the one or more reputation factors; and
detecting fraud associated with use of the network device across the plurality of network service providers.

30. The system of claim 29, wherein the evaluation of the one or more reputation factors comprises:
selecting a portion of the one or more reputation factors associated with the device identifier; and
evaluating only the selected portion of the one or more reputation factors.

31. The system of claim 29, wherein the method further comprises:
downloading a client application to the network device, the client application being configured to gather information about the network device, generate the device identifier that identifies the network device based on the information gathered, and transmit the device identifier.

32. The system of claim 31, wherein the client application is embedded in another software application or a stand-alone software application.

33. The system of claim 31, wherein the at least one of the plurality of network providers automatically downloads the client application to the network device.

34. The system of claim 31, wherein the at least one of the plurality of network providers automatically downloads the client application to the network device when the network device connects to the at least one of the plurality of network providers.

35. A system for use with a network device configured to connect to the system over a communications network, the system comprising:
- a fraud detection server comprising one or more storage devices, and one or more processors connected to the one or more storage devices, the one or more storage devices storing instructions executable by the one or more processors that when executed thereby implement a method comprising obtaining a device identifier associated with the network device, the device identifier being associated with one or more reputation factors; and
- a plurality of network service providers connected to the fraud detection server, each of the plurality of network service providers comprising one or more storage devices, and one or more processors connected to the one or more storage devices, the one or more storage devices storing instructions executable by the one or more processors that when executed thereby implement a method comprising generating a reputation for the network device based on an evaluation of the one or more reputation factors associated with the device identifier, and sharing the reputation with others of the plurality of network service providers for use thereby to detect fraudulent use of the network device.

36. The system of claim 35, wherein the one or more reputation factors further comprise one or more of end-user account information provided by one of the plurality of network service providers, a credit card account number of a user, a fingerprint of the user, an email address of the user, a phone number of the user, a physical address of the user, and a cellular phone number of the user.

37. The system of claim 35, wherein the evaluation comprises:
  cross-correlating the one or more reputation factors to generate the reputation.

38. The system of claim 35, wherein the evaluation comprises:
  selecting a portion of the one or more reputation factors associated with the device identifier; and
  evaluating only the selected portion of the one or more reputation factors.

39. The method of claim 1, wherein the evaluation comprises:
  filtering the one or more reputation factors associated with the device identifier to thereby filter out a first portion of the one or more reputation factors associated with the device identifier; and
  evaluating a second portion of the one or more reputation factors associated with the device identifier that were not filtered out to generate the reputation.

* * * * *